(12) United States Patent
Zhou et al.

(10) Patent No.: US 12,499,015 B2
(45) Date of Patent: Dec. 16, 2025

(54) INSTANT FILE SYSTEM SNAPSHOT RESTORATION

(71) Applicant: International Business Machines Corporation, Armonk, NY (US)

(72) Inventors: Hai Zhong Zhou, Beijing (CN); Frank Schmuck, Campbell, CA (US); Kuei-Yu Wang-Knop, Poughkeepsie, NY (US); Owen T. Anderson, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/621,276

(22) Filed: Mar. 29, 2024

(65) Prior Publication Data

US 2025/0307085 A1 Oct. 2, 2025

(51) Int. Cl.
*G06F 11/00* (2006.01)
*G06F 11/07* (2006.01)
*G06F 11/14* (2006.01)

(52) U.S. Cl.
CPC ...... *G06F 11/1469* (2013.01); *G06F 11/0772* (2013.01); *G06F 11/1466* (2013.01); *G06F 2201/80* (2013.01); *G06F 2201/84* (2013.01)

(58) Field of Classification Search
CPC .......... G06F 11/1469; G06F 11/0772; G06F 11/1466; G06F 2201/80; G06F 2201/84
See application file for complete search history.

(56) References Cited

U.S. PATENT DOCUMENTS

| 9,971,656 | B2 | 5/2018 | Hay |
| 10,114,564 | B2 | 10/2018 | Jain |
| 10,114,565 | B2 | 10/2018 | Nithrakashyap |
| 10,114,705 | B1* | 10/2018 | Kumar ............... G06F 11/1469 |
| 11,079,941 | B2 | 8/2021 | Jain |
| 2004/0030951 | A1* | 2/2004 | Armangau ......... G06F 11/1469 |
| | | | 714/E11.122 |

(Continued)

OTHER PUBLICATIONS

"An efficient method for immediate recovery of large scale data center from block-level backups", IP.com, IPCOM000222918D, Oct. 29, 2012, 5 pages.

(Continued)

*Primary Examiner* — Jason B Bryan
(74) *Attorney, Agent, or Firm* — CHIP LAW GROUP

(57) ABSTRACT

Snapshot restoration based on a correlation of a snapshot namespace with a file system namespace is provided. A restore command is received, following which the correlation between the file system namespace of the file system with the snapshot namespace of a snapshot of the file system is performed. Further a file operation command is received to perform at least one of a read file operation and a lookup file operation, corresponding to at least one object associated with the file system namespace of the file system. Further, based on restoration data associated with the at least one object, a redirection operation is executed for at least one of the read file operation and the lookup file operation. The redirection operation routes the file operation command to at least one respective snapshot object associated with the snapshot namespace, corresponding to the at least one object.

10 Claims, 19 Drawing Sheets

(56) References Cited

U.S. PATENT DOCUMENTS

2021/0034474 A1\* 2/2021 Khandkar ........... G06F 11/1469
2024/0028466 A1\* 1/2024 Duggal ............... G06F 16/2246

OTHER PUBLICATIONS

"Continuous Data Protection for ReadyNAS® OS 6", Netgear, 2020, 5 pages.

"Dell PowerProtect Data Manager: File System Backup and Recovery", Dell Technologies, Technical White Paper, H18659.7, Oct. 2022, 25 pages.

"Methodology for Enabling Snapshots in an NFS-as-a-Service Hosting Environment", IP.com, IPCOM000267023D, Sep. 16, 2021, 8 pages.

"Restoring a container from a system dump file", IP.com, IPCOM000261585D, Mar. 19, 2020, 5 pages.

\* cited by examiner

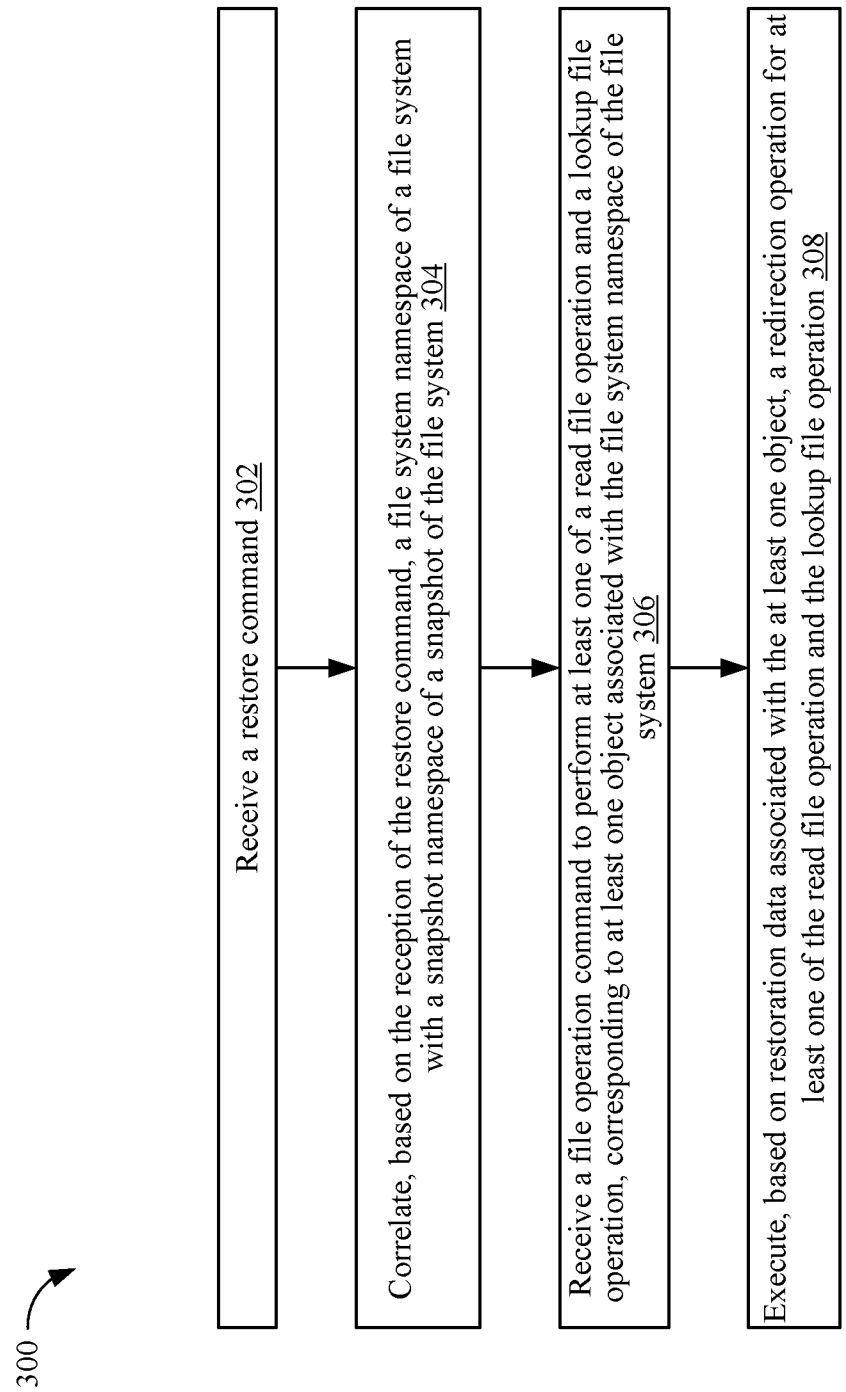

INSTANT FILE SYSTEM SNAPSHOT RESTORATION

BACKGROUND

The present disclosure relates to file system data restoration, and more specifically, snapshot based file system data restoration. With the advancement of processing technologies, the volume of digital information has increased, and value of the digital information has also increased. Hence, in order to prevent a loss of the digital information, for example, data loss, data corruption, and the like, a need for data backup and restoration arises. File system snapshots provide a mechanism for data backup and restoration in modern computing environments. A file system snapshot is a point-in-time state of a file system that captures hierarchy of files, directories, and metadata at a specific point-in-time. By capturing the point-in-time state of the file system at periodic intervals, the file system snapshots enable organizations to store and restore multiple historical versions of the digital information, providing protection from data loss. Further, in the event of a disaster, the file system snapshots facilitate a point-in-time recovery, allowing the organizations to restore the digital information to a previous state.

However, there are problems associated with the utilization of the file system snapshots for data backup and restoration variations. For example, it is desirable that the data backup and restoration time is reduced, to minimize a downtime of the file system, enabling organizations to quickly resume normal operations after the disasters. However, performing the data backup and restoration is generally a time-consuming process and also involves intensive input/output (I/O) operations that increase the overhead of performing the data backup and restoration for a large file system.

SUMMARY

According to an embodiment of the present disclosure, a computer-implemented method is provided. The computer-implemented method includes receiving a restore command. The computer-implemented method further includes correlating, based on the reception of the restore command, a file system namespace of a file system with a snapshot namespace of a snapshot of the file system. The computer-implemented method further includes receiving a file operation command to perform at least one of a read file operation and a lookup file operation, corresponding to at least one object associated with the file system namespace of the file system. The computer-implemented method further includes executing a redirection operation for at least one of the read file operation and the lookup file operation, based on restoration data associated with the at least one object. The redirection operation routes the file operation command to at least one respective snapshot object corresponding to the at least one object. The at least one respective snapshot object is associated with the snapshot namespace of the snapshot of the file system.

According to an embodiment of the present disclosure, a system that includes a memory that stores instructions and a processor configured to execute the instructions, is provided. The processor is configured to receive a restore command. The processor is further configured to correlate, based on the reception of the restore command, a file system namespace of a file system with a snapshot namespace of a snapshot of the file system. The processor is further configured to receive a file operation command to perform one or more of (i) at least one of a read file operation and a lookup file operation, and (ii) a write file operation, corresponding to at least one object associated with the file system namespace of the file system. The processor is further configured to execute, based on restoration data associated with the at least one object, a redirection operation for at least one of the read file operation and the lookup file operation. The redirection operation routes the file operation command to at least one respective snapshot object corresponding to the at least one object. The at least one respective snapshot object is associated with the snapshot namespace of the snapshot of the file system. The processor is further configured to perform, based on the restoration data associated with the file system namespace, the write file operation corresponding to the file system namespace.

Further embodiments of the present disclosure are directed to computer program products containing functionality consistent with the method described above.

Additional technical features and benefits are realized through the techniques of the present disclosure. Embodiments and aspects of the present disclosure are described in detail herein and are considered a part of the claimed subject matter. For a better understanding, refer to the detailed description and to the drawings.

BRIEF DESCRIPTION OF DRAWINGS

The following description will provide details of preferred embodiments with reference to the following figures, wherein:

FIG. 3 is a flowchart of an exemplary method for the snapshot restoration, in accordance with an embodiment of the present disclosure;

DETAILED DESCRIPTION

Various embodiments of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
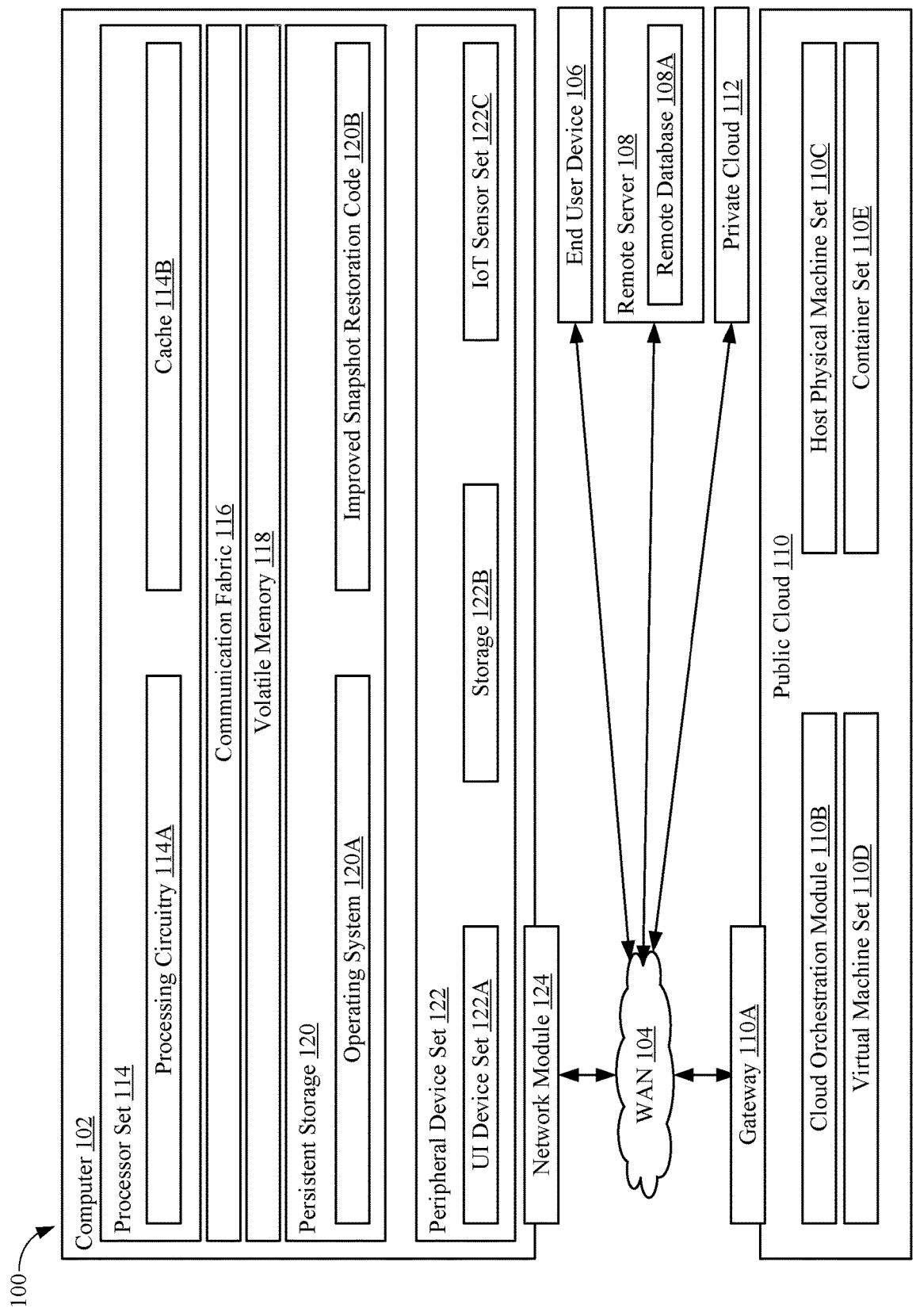
FIG. 1 is a diagram that illustrates a computing environment, in accordance with an embodiment of the present disclosure.

FIG. 1 is a diagram that illustrates a computing environment 100, in accordance with embodiment of the present disclosure. The diagram contains an exemplary environment for execution of at least some of a computer code involved in performing inventive methods, such as an improved snapshot restoration code 120B. In addition to the improved snapshot restoration code 120B, the computing environment 100 includes, for example, a computer 102, a wide area network (WAN) 104, an end user device (EUD) 106, a remote server 108, a public cloud 110, and a private cloud 112. In this embodiment, the computer 102 includes a processor set 114 (including a processing circuitry 114A and a cache 114B), a communication fabric 116, a volatile memory 118, a persistent storage 120 (including an operating system 120A and the improved snapshot restoration code 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 108A. As is well understood in the art of computer technology, and depending upon the technology, performance of a computer-implemented method may be distributed among multiple computers and/or between multiple locations. On the other hand, in this presentation of the computing environment 100, detailed discussion is focused on a single computer, specifically the computer 102, to keep the presentation as simple as possible. The computer 102 may be located in a cloud, even though it is not shown in a cloud in FIG. 1. On the other hand, the computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located off chip. In some computing environments, the processor set 114 may be designed for working with qubits and performing quantum computing.

Computer readable program instructions are typically loaded onto the computer 102 to cause a series of operational steps to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 114B and the other storage media discussed below. The program instructions, and associated data, are accessed by the processor set 114 to control and direct performance of the inventive methods. In the computing environment 100, at least some of the instructions for performing the inventive methods may be stored in the improved snapshot restoration code 120B in the persistent storage 120.

The communication fabric 116 is the signal conduction path that allows the various components of the computer 102 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by random access, but this is not required unless affirmatively indicated. In the computer 102, the volatile memory 118 is located in a single package and is internal to the computer 102, but, alternatively or additionally, the volatile memory 118 may be distributed over multiple packages and/or located externally with respect to the computer 102.

The persistent storage 120 is any form of non-volatile storage for computers that is now known or to be developed in the future. The non-volatility of this storage means that the stored data is maintained regardless of whether power is being supplied to the computer 102 and/or directly to the persistent storage 120. The persistent storage 120 may be a read only memory (ROM), but typically at least a portion of the persistent storage 120 allows writing of data, deletion of data and re-writing of data. Some familiar forms of the persistent storage 120 include magnetic disks and solid state storage devices. The operating system 120A may take several forms, such as various known proprietary operating systems or open source Portable Operating System Interface-type operating systems that employ a kernel. The improved snapshot restoration code 120B typically includes at least some of the computer code involved in performing the inventive methods.

The peripheral device set 122 includes the set of peripheral devices of the computer 102. Data communication connections between the peripheral devices and the other components of the computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 122A may include components such as a display screen, speaker, microphone, wearable devices (such as goggles and smart watches), keyboard, mouse, printer, touchpad, game controllers, and haptic devices. The storage 122B is external storage, such as an external hard drive, or insert able storage, such as an SD card. The storage 122B may be persistent and/or volatile. In an embodiment of the present disclosure, the storage 122B may take the form of a quantum computing storage device for storing data in the form of qubits. In embodiments where the computer 102 is required to have a large amount of storage (for example, where the computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that can be used in Internet of Things applications. For example, one sensor may be a thermometer and another sensor may be a motion detector.

The network module 124 is the collection of computer software, hardware, and firmware that allows the computer 102 to communicate with other computers through the WAN 104. The network module 124 may include hardware, such as modems or Wi-Fi signal transceivers, software for packetizing and/or de-packetizing data for communication network transmission, and/or web browser software for communicating data over the internet. In an embodiment of the present disclosure, network control functions and network forwarding functions of the network module 124 are performed on the same physical hardware device. In other embodiments (for example, embodiments that utilize software-defined networking (SDN)), the control functions and the forwarding functions of the network module 124 are performed on physically separate devices, such that the control functions manage several different network hardware devices. Computer readable program instructions for performing the inventive methods can typically be downloaded to the computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In an embodiment of the present disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibres, wireless transmission, routers, firewalls, switches, gateway computers and edge servers.

The end user device (EUD) 106 is any computer system that is used and controlled by an end user (for example, a customer of an enterprise that operates the computer 102) and may take any of the forms discussed above in connection with the computer 102. The EUD 106 typically receives helpful and useful data from the operations of the computer 102. For example, in a hypothetical case where the computer 102 is designed to provide a recommendation to an end user, this recommendation would typically be communicated from the network module 124 of the computer 102 through the WAN 104 to the EUD 106. In this way, the EUD 106 can display, or otherwise present, the recommendation to an end user. In an embodiment of the present disclosure, the EUD 106 may be a client device, such as thin client, heavy client, mainframe computer, desktop computer and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by other computers, such as the computer 102. For example, in a hypothetical case where the computer 102 is designed and programmed to provide a recommendation based on historical data, then this historical data may be provided to the computer 102 from the remote database 108A of remote server 108.

The public cloud 110 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after instantiation of the VCE. The cloud orchestration module 110B manages the transfer and storage of images, deploys new instantiations of VCEs and manages active instantiations of VCE deployments. The Gateway 110A is the collection of computer software, hardware, and firmware that allows the public cloud 110 to communicate through the WAN 104.

The VCEs can be stored as images. A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to the public cloud 110, except that the computing resources are only available for use by a single enterprise. While the private cloud 112 is depicted as being in communication with the WAN 104, in other embodiments a private cloud may be disconnected from the internet entirely and only accessible through a local/private network. A hybrid cloud is a composition of multiple clouds of diverse types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 110 and the private cloud 112 are both part of a larger hybrid cloud.

Referring back to FIG. 1, various components of the computing environment 100, for example the computer 102, the WAN 104, the EUD 106, the remote server 108, the public cloud 110, and the private cloud 112 may enable an execution of the at least some of the computer code, for example, the improved snapshot restoration code 120B for snapshot restoration. Further, various components of the computer 102, for example, the processor set 114 or an instance of the processor set 114, for example, the processing circuitry 114A may execute the instructions of the improved snapshot restoration code 120B for the snapshot restoration. Further, the computer 102 may use the cache 114B to increase a speed of the snapshot restoration. The volatile memory 118 may temporarily store several types of data that the computer 102 may use for the execution of the improved snapshot restoration code 120B. The persistent storage 120 may store the operating system 120A, the improved snapshot restoration code 120B and/or the several types of data. The peripheral devices set 122 may obtain the several types of data that the computer 102 may use for the execution of the improved snapshot restoration code 120B.

The peripheral devices set 122 may provide an external storage to store the several types of data. Additionally, or alternatively, the peripheral devices set 122 may receive a user input for the execution of the improved snapshot restoration code 120B. The network module 124 may allow the computer 102 to communicate with components of network environments (explained with reference to FIG. 2A and FIG. 2B) via the WAN 104 to obtain the several types of data for the execution of the improved snapshot restoration code 120B. Further, the remote server 108 may store the several types of data and/or functionality, for example, a data backup functionality, a snapshot versioning functionality, and the like to the computer 102. The public cloud 110 and the private cloud 112 may provide on-demand computing resources and/or a cloud data storage to the computer 102 for the execution of the improved snapshot restoration code 120B. Further, the EUD 106 may receive an output of the computer 102 that indicates the execution of the improved snapshot restoration code 120B via virtualization.

To perform data backup and restoration with a traditional file system snapshot restoration process, there is a need to scan a file system and snapshot data of a file system snapshot to determine changes, independent of the size or scope of the changes. Further, a restoration operation is performed to restore the determined changes to the file system. The comparison operation increases an overhead for a large file system with a high volume of digital information. Additionally, the comparison operation and the restoration operation include intensive input/output (I/O) operations that further increase the overhead for the large file system. However, using the improved snapshot restoration code 120B, the restoration of snapshot data associated with the file system snapshot to the file system is performed instantly, which provides faster and more efficient the data backup and restoration than the traditional file system restoration process.

The improved snapshot restoration code 120B may utilize at least one read-only snapshot of the file system to mitigate problems associated with the utilization of writeable snapshots of the file system and file system clone techniques for the restoration operation. With regards to performing the data backup and the restoration operation based on the writable snapshots of the file system or the file system clone techniques there is a need to perform additional operations, for example, completion of the restoration operation before unfreezing the file system, renaming of the writable snapshots, deletion of the determined changes, updating of data pointers to the writable snapshots, and cloning to a new file system name after renaming an initial file system name to the new file system name. The additional operations further increase the overhead for the large file system with the high volume of digital information and decrease the speed of the snapshot restoration. Further, the restoration operation based on the writable snapshots is limited to the restoration from a current writable snapshot of the file system or the restoration from a new writable snapshot of the file system generated after a restoring current writable snapshot.

In an embodiment of the present disclosure, the improved snapshot restoration code 120B may is configured to perform the restoration from the at least one read-only snapshot of the file system by decoupling the restoration of the file system and individual objects associated with the file system. The improved snapshot restoration code 120B may correlate, based on a restore command, a file system namespace of the file system and a snapshot namespace of the at least one read-only snapshot of the file system and defer the restoration of the individual objects associated with the file system namespace of the file system to a first write operation on the individual objects associated with the file system.

In an embodiment of the present disclosure, the improved snapshot restoration code 120B may freeze the file system based on at least one of a file system quiesce operation, a flush cached data operation, an invalidate cached data operation, an invalidate metadata operation during an initial file system restoration operation. In an embodiment of the present disclosure, the improved snapshot restoration code 120B may freeze the file system before a namespace correlation between the file system namespace of the file system and the snapshot namespace of the at least one read-only snapshot of the file system. In an embodiment of the present disclosure, the improved snapshot restoration code 120B may re-initiate operations associated with the computer 102 after the namespace correlation between the file system namespace of the file system and the snapshot namespace of the at least one read-only snapshot of the file system. In an embodiment of the present disclosure, the improved snapshot restoration code 120B may allow the computer 102 to access the at least one read-only snapshot after a completion of the restoration operation.

Figure 2A:
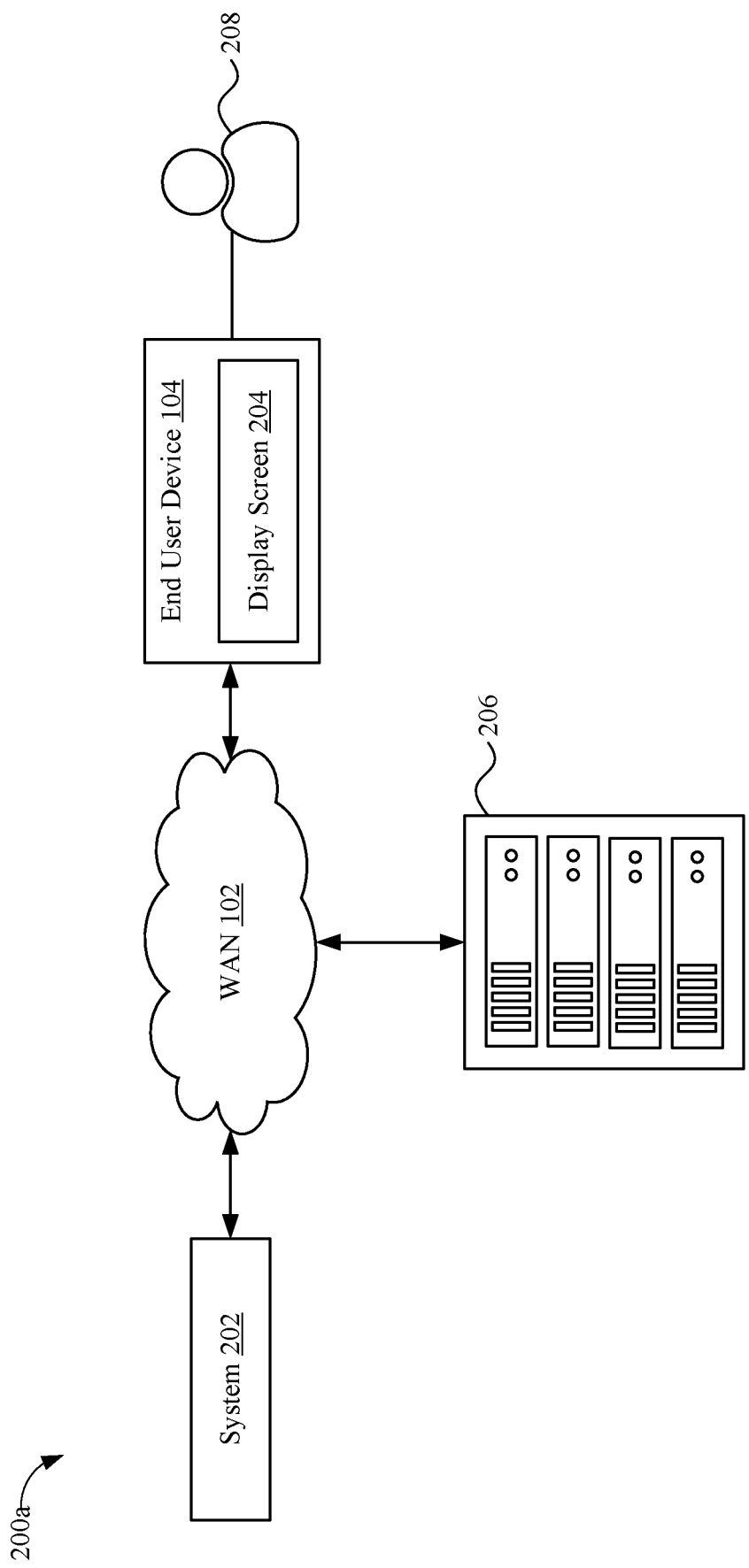
FIG. 2A is a diagram that illustrates an environment in which a system for snapshot restoration is implemented, in accordance with an embodiment of the present disclosure.

FIG. 2A is a diagram that illustrates an environment in which a system 202 for the snapshot restoration is implemented, in accordance with an embodiment of the present disclosure. FIG. 2A is explained in conjunction with elements from FIG. 1. With reference to FIG. 2A, there is shown a diagram of a network environment 200a. The network environment 200a includes the system 202, a display screen 204, a server 206, and a user 208. The network environment 200a may further include the EUD 106, and the WAN 104 of FIG. 1. In an embodiment of the present disclosure, the system 202 may be an exemplary embodiment of the computer 102 of FIG. 1.

The system 202 may include suitable logic, circuitry, interfaces, and/or code that may employ one or more backup and restoration mechanisms to prevent risks, for example, a data loss, a data corruption, a data unavailability, and the like due to disasters. Examples of the disasters include, but are not limited to, hardware failures, malware attacks, natural disasters, human errors, and the like. By implementing the one or more backup and restoration mechanisms, the system 202 may mitigate the risks, and increase an operational efficiency associated with a file system associated with the system 202. In an embodiment of the present disclosure, the file system may be integrated within the system 202. The file system is described in detail with reference to FIG. 2B. In an embodiment of the present disclosure, the system 202 may correspond to a standalone unit configured to receive, transmit, validate, and store the various types of data associated with the components in the network environment 200a. Examples of the system 202 may include, but are not limited to, a computing device, a virtual computing device, a mainframe machine, a server, a computer workstation, a smartphone, a cellular phone, a mobile phone, a gaming device, a consumer electronic (CE) device and/or any other device with snapshot restoration capabilities.

The EUD 106 may include suitable logic, circuitry, interfaces, and/or code that may provide the restore command, as the user input, to the system 202. In an embodiment of the present disclosure, the system 202 may correlate, based on the restore command, the file system namespace of the file system with a snapshot namespace of a snapshot of the file system. Hereinafter, the correlation between the file system namespace and the snapshot namespace is referred to as "namespace correlation". The snapshot may store a point-in-time state of the file system. In an embodiment of the present disclosure, the system 202 may defer, based on the namespace correlation between the file system namespace and the snapshot namespace of the snapshot of the file system, the restoration operation corresponding to the point-in-time state of the file system stored in the snapshot. In an embodiment of the present disclosure, the system 202 may control the display screen 204 of the EUD 106 to display the namespace correlation between the file system namespace of the file system and the snapshot namespace of the snapshot of the file system on the display screen 204. The EUD 106 may be associated with the user 208 that performs the restoration operation corresponding to the snapshot. Examples of the EUD 106 may include, but are not limited to, a computing device, a mainframe machine, a server, a computer workstation, a smartphone, a cellular phone, a mobile phone, a gaming device, a consumer electronic (CE) device and/or any other device with backup and the snapshot restoration capabilities.

The display screen 204 may comprise suitable logic, circuitry, and interfaces that may display the restoration operation. In an embodiment of the present disclosure, the display screen 204 may display the namespace correlation between the file system namespace of the file system and the snapshot namespace of the snapshot of the file system. In an embodiment of the present disclosure, the display screen 204 may further display one or more user interface elements from which the user 208 may be able to provide the user input. In an embodiment of the present disclosure, the display screen 204 may be an external display device associated with the EUD 106. The display screen 204 may be a touch screen which may enable the user 208 to provide the user input via the display screen 204. The touch screen may be at least one of a resistive touch screen, a capacitive touch screen, or a thermal touch screen. The display screen 204 may be realized through several known technologies such as, but are not limited to, at least one of a Liquid Crystal Display (LCD) display, a Light Emitting Diode (LED) display, a plasma display, or an Organic LED (OLED) display technology, or other display devices. In an embodiment of) the present disclosure, the display screen 204 may refer to a display screen of a head-mounted device (HMD), a smart-glass device, a see-through display, a projection-based display, an electro-chromic display, or a transparent display.

The server 206 may include suitable logic, circuitry, and interfaces, and/or code that may be store the snapshot. The server 206 may store a plurality of snapshots. The server 206 may be implemented as a cloud server and may execute operations through web applications, cloud applications, Hyper Text Transfer Protocol (HTTP) requests, repository operations, file transfer, and the like. Other example implementations of the server 206 may include, but are not limited to, a database server, a file server, a web server, a media server, an application server, a mainframe server, or a cloud computing server. In another embodiment of the present disclosure, the file system may be decoupled with the system 202. Accordingly, a network environment is provided in detail with reference to FIG. 2B.

Figure 2B:
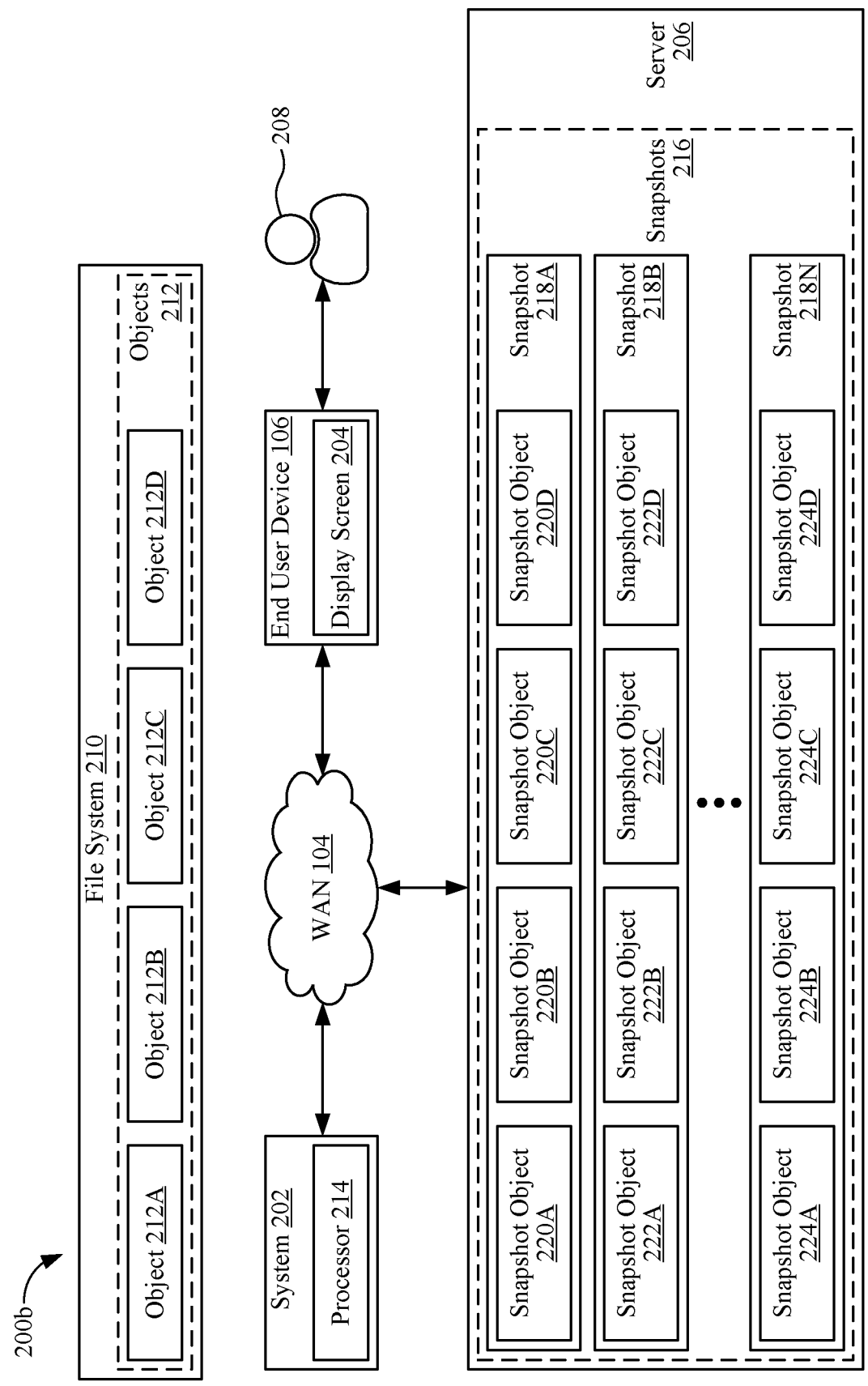
FIG. 2B is a diagram that illustrates a network environment in which the system for the snapshot restoration is implemented with a file system, in accordance with an embodiment of the present disclosure.

FIG. 2B is a diagram that illustrates a network environment 200b in which the system 202 for the snapshot restoration is implemented with a file system 210, in accordance with an embodiment of the present disclosure. FIG. 2B is explained in conjunction with elements from FIG. 1 and FIG. 2A. The network environment 200b includes the system 202, the display screen 204, the server 206, and the user 208, and the file system 210. The network environment 200b may further include the EUD 106, and the WAN 104 of FIG. 1. The system 202 may include a processor 214 to execute instructions stored in a memory, for example, the volatile memory 118. In an embodiment of the present disclosure, the processor 214 may be an exemplary embodiment of the processing circuitry 114A of FIG. 1.

The file system 210 may comprise a plurality of objects 212, for example, an object 212A, an object 212B, an object 212C, and an object 212D. For the purpose of explanation, the file system 210 comprising four objects is considered. However, the file system 210 may comprise at least one object. In an embodiment of the present disclosure, the at least one object may correspond to a data unit, for example, a file, a directory, a subdirectory, and the like. The file system 210 may utilize the file to store the various types of data, for example, text data, image data, video data, and the like. Further, the file system 210 may utilize the directory and/or the subdirectory to organize different files and directories in a hierarchical structure.

In an embodiment of the present disclosure, the file system 210 may store the various types of data associated with the at least one object, for example, the file in block level data units, for example, one or more data blocks, one or more pages, one or more clusters, one or more extents, and the like associated with the file system 210. The one or more data blocks may store actual data bytes corresponding to the various types of data. The one or more clusters may correspond to a set of at least two data blocks allocated to store the various types of data. The one or more extents may correspond to continuous range of the one or more data blocks allocated to store the various types of data. The one or more pages may correspond to a predetermined-size unit of memory, for example, 4 kilobytes (4 KB), 8 KB, and the like allocated to store the various types of data.

In an embodiment of the present disclosure, the file system 210 may allocate the one or more data blocks to store the various types of data. In an embodiment of the present disclosure, a size of the one or more data blocks is constant. In another embodiment of the present disclosure, a size of the one or more data blocks is varying. In an embodiment of the present disclosure, the file system 210 may determine, based on pointers, a correlation between the various types of data and the plurality of objects 212. The pointers may include, but are not limited to, direct pointers, and indirect pointers. The direct pointers may indicate at least one data block corresponding to the at least one object. The indirect pointers may indicate at least one other data block that include a pointer indicative of the at least one data block corresponding to the at least one object.

Examples of the file system 210 include, but are not limited to, a file allocation table file system, a new technology file system, an extended file allocation table file system, an extended file system, a distributed file system, a hierarchical file system plus, a resilient file system, a B-tree file system, and a zettabyte file system. In an embodiment of the present disclosure, the file system 210 may be embodied in one or more of several ways as per a required implementation. In an embodiment of the present disclosure, the file system 210 may be embodied as a cloud-based service or a cloud-based platform. In each of such embodiments, the file system 210 may be communicatively coupled to the components shown in FIG. 1 and FIG. 2A to conduct desired operations and wherever required modifications may be possible within the scope of the present disclosure.

The system 202 may further include the suitable logic, the circuitry, interfaces, and/or the code that may perform a plurality of operations for managing the plurality of objects 212 associated with the file system 210. The plurality of operations includes, but are not limited to, a read operation, a lookup operation, a write operation, a create operation, a delete operation, and a rename operation. The read operation may correspond to an operation for retrieving the various types of data from the at least one object, for example, the file, the directory, the subdirectory, and the like. The read operation includes accessing and interpreting the various types of data stored in the at least one object, allowing the various components of the network environment to visualize the various types of data. In an embodiment of the present disclosure, the read operation is a read file operation based on the at least one object corresponds to the file. In an embodiment of the present disclosure, the read operation is a read directory operation based on the at least one object corresponds to the directory. In an embodiment of the present disclosure, the read operation is a read subdirectory operation based on the at least one object corresponds to the subdirectory.

The lookup operation may correspond to an operation for searching for a specific portion of the various types of data within the at least one object. In an embodiment of the present disclosure, the system 202 may perform the lookup operation based on at least one key or at least one identifier. The lookup operation includes querying the at least one object, such as, a database table, a dictionary to determine a corresponding value associated with the at least one key or the at least one identifier. In an embodiment of the present disclosure, the lookup operation is a lookup file operation based on the at least one object corresponds to the file. In an embodiment of the present disclosure, the lookup operation is a lookup directory operation based on the at least one object corresponds to the directory. In an embodiment of the present disclosure, the lookup operation is a lookup subdirectory operation based on the at least one object corresponds to the subdirectory.

The write operation may correspond to an operation for updating the various types of data stored within the at least one object. In an embodiment of the present disclosure, the write operation includes adding new data to the least one object for updating the various types of data. In another embodiment of the present disclosure, the write operation includes deleting at least a portion of the various types of data stored within the at least one object. In an embodiment of the present disclosure, the write operation is a write file operation based on the at least one object corresponds to the file. In an embodiment of the present disclosure, the write operation is a write directory operation based on the at least one object corresponds to the directory. In an embodiment of the present disclosure, the write operation is a write subdirectory operation based on the at least one object corresponds to the subdirectory.

The create operation may correspond to an operation for generating at least one new object, for example, a new file, a new directory, a new subdirectory, and the like within the file system 210. In an embodiment of the present disclosure, the create operation is a create file operation based on the at least one object corresponds to the file. In an embodiment of the present disclosure, the create operation is a create directory operation based on the at least one object corresponds to the directory. In an embodiment of the present disclosure, the create operation is a create subdirectory operation based on the at least one object corresponds to the subdirectory.

The delete operation may correspond to an operation for deleting the at least one object associated with the file system 210. In an embodiment of the present disclosure, the delete operation is a delete file operation based on the at least one object corresponds to the file. In an embodiment of the present disclosure, the delete operation is a delete directory operation based on the at least one object corresponds to the directory. In an embodiment of the present disclosure, the delete operation is a delete subdirectory operation based on the at least one object corresponds to the subdirectory. The rename operation may correspond to an operation for updating an object name associated with the at least one object. In an embodiment of the present disclosure, the rename operation is a rename file operation based on the at least one object corresponds to the file. In an embodiment of the present disclosure, the delete operation is a rename directory operation based on the at least one object corresponds to the directory. In an embodiment of the present disclosure, rename operation is rename subdirectory operation based on the at least one object corresponds to the subdirectory.

In an embodiment of the present disclosure, the system 202 may perform the plurality of operations based on file system calls provided by the operating system 120A. In another embodiment of the present disclosure, the system 202 may perform the plurality of operations based on at least one of file system utilities and operation commands. Additionally, or alternatively, the system 202 may generate the operation commands to the file system 210. Further, based on the operation commands, the file system 210 may perform the plurality of operations.

The system 202 may store a plurality of snapshots 216 in the server 206. The plurality of snapshots 216 may include a snapshot 218A, a snapshot 218B, and a snapshot 218N. The snapshot 218A may include a snapshot object 220A, a snapshot object 220B, a snapshot object 220C, and a snapshot object 220D. The snapshot 218B may include a snapshot object 222A, a snapshot object 222B, a snapshot object 222C, and a snapshot object 222D. The snapshot 218N may include a snapshot object 224A, a snapshot object 224B, a snapshot object 224C, and a snapshot object 224D. In an embodiment of the present disclosure, the file system 210 may utilize data structures, for example, tables, inodes, and the like to manage the plurality of objects 212.

In an embodiment of the present disclosure, the system 202, or an instance of the system 202, for example, the processor 214 may iteratively perform a snapshot generation operation to generate the plurality of snapshots 216. Further, each snapshot of the plurality of snapshots 216 may include at least one respective snapshot object corresponding to the at least one object associated with the file system 210. In an embodiment of the present disclosure, the server 206 may receive the plurality of snapshots 216 from the system 202 via the WAN 104. In an embodiment of the present disclosure, the plurality of snapshots 216 may corresponds to read-only snapshots. The read-only snapshots are immutable and maintain a constant point-in-time state corresponding to the at least one object associated with the file system 210.

In an embodiment of the present disclosure, the system 202, or the instance of the system 202, for example, the processor 214 may store a snapshot version corresponding to each snapshot of the plurality of snapshots 216. Further, each snapshot of the plurality of snapshots 216 may store a point-in-time state of the file system 210. Specifically, each snapshot of the plurality of snapshots 216 may store the point-in-time state of the at least one object associated with the file system 210 corresponding to the at least one respective snapshot object.

In an embodiment of the present disclosure, the snapshot 218A stores a first point-in-time state of the object 212A, the object 212B, the object 212C, and the object 212D corresponding to the snapshot object 220A, the snapshot object 220B, the snapshot object 220C, and the snapshot object 220D, respectively.

In another embodiment of the present disclosure, the snapshot 218B stores a second point-in-time state of the object 212A, the object 212B, the object 212C, and the object 212D corresponding to the snapshot object 222A, the snapshot object 222B, the snapshot object 222C, and the snapshot object 222D, respectively.

In another embodiment of the present disclosure, the snapshot 218N stores a nth point-in-time state of the object 212A, the object 212B, the object 212C, and the object 212D corresponding to the snapshot object 224A, the snapshot object 224B, the snapshot object 224C, and the snapshot object 224D, respectively.

The EUD 106 may include suitable the logic, the circuitry, the interfaces, and/or the code that may provide the operation commands, as the user input, to the system 202. In an embodiment of the present disclosure, the system 202 may perform, based on the operation commands, the plurality of operations for managing the plurality of objects 212 associated with the file system 210. In another embodiment of the present disclosure, the system 202 may perform the plurality of operations after correlating, based on the restore command, the file system namespace of the file system 210 with the snapshot namespace of the snapshot, for example, the snapshot 218A of the file system 210. In an embodiment of the present disclosure, the system 202 may control the display screen 204 of the EUD 106 to display the plurality of operation after correlating, based on the restore command, the file system namespace of the file system 210 with the snapshot namespace of the snapshot, for example, the snapshot 218A of the file system 210 on the display screen 204. The EUD 106 may be associated with the user 208 that performs the plurality of operations after correlating, based on the restore command, the file system namespace of the file system 210 with the snapshot namespace of the snapshot, for example, the snapshot 218A of the file system 210.

Referring back to FIG. 2A and FIG. 2B, the network environments include the components for the snapshot restoration. In an embodiment of the present disclosure, the components, for example, the system 202, the processor 214, the EUD 106, the server 206, and the file system 210 may enable the system 202 to perform the plurality of operations, for example, the read operation, the write operation, and the like after correlating, based on the restore command, the file system namespace of the file system 210 with the snapshot namespace of the snapshot, for example, the snapshot 218A of the file system 210.

In an embodiment of the present disclosure, the processor 214 may perform the restoration operation instantly based on the namespace correlation between the file system namespace of the file system with the snapshot namespace of the snapshot of the file system. In an embodiment of the present disclosure, the processor 214 may utilize the read-only snapshots to perform the plurality of operations after correlating, based on the reception of the restore command, the file system namespace of the file system 210 with the snapshot namespace of the snapshot, for example, the snapshot 218A of the file system 210. Additionally, or alternatively, the namespace correlation may allow the processor 214 to perform the restoration operation instantly and minimize a downtime of the file system 210 associated with a comparison of the file system 210 and snapshot data of the snapshot, for example, the snapshot 218A to determine changes for the restoration operation. Accordingly, a method is provided below with reference to FIG. 3, for the snapshot restoration that is configured to reduce the downtime of the file system 210.

FIG. 3 is a flowchart of an exemplary method 300 for the snapshot restoration, in accordance with an embodiment of the present disclosure. In one or more example embodiments of the present disclosure, the system 202 may perform one or more operations of the method 300 and may be implemented by, for instance, the processor 214. As such, the system 202 may provide means for accomplishing embodiments of other operations described herein in conjunction with other components of the system 202. Although the method 300 is illustrated as a sequence of operations, it is contemplated that various embodiments of the method 300 may be performed in any order or combination and need not include all of the illustrated one or more operations.

At 302, a restore command is received. In an embodiment of the present disclosure, the restore command is received corresponding to the snapshot, for example, the snapshot 218A of the file system 210. In an embodiment of the present disclosure, the restore command is received from the user 208 via the user interface. In an embodiment of the present disclosure, the restore command is received via an application programmable interface (API) provided by an API service provider. In an embodiment of the present disclosure, the system 202 may initiate the restore command based on predetermined events, for example, based on a determination of a malware attack, a data corruption, a missing object associated with the file system 210.

At 304, the file system namespace of the file system 210 is correlated with the snapshot namespace of the snapshot, for example, the snapshot 218A of the file system 210 based on the reception of the restore command. In an embodiment of the present disclosure, the correlated file system namespace may indicate the snapshot namespace of the snapshot, based on a snapshot namespace identifier associated with the snapshot of the file system 210. The namespace correlation between the file system namespace of the file system 210 and the snapshot namespace of the snapshot of the file system 210 allows for the instant snapshot restoration of the snapshot by decoupling the restoration of the file system 210 and the individual objects, for example, the object 212A, the object 212B, the object 212C and the object 212D associated with the file system 210. Further, the restoration of the individual objects, for example, the object 212A, the object 212B, the object 212C, and the object 212D associated with the file system 210 is deferred to the first write operation on the individual objects.

In an embodiment of the present disclosure, the processor 214 may generate the file system namespace corresponding to the plurality of objects 212. The file system namespace may correspond to a logical hierarchical structure of the plurality of objects 212, for example, the different directories and files, and file path names that combine to form the file system 210. Additionally, or alternatively, the file system namespace is a set of valid object names validated by the file system 210. Further, in an embodiment of the present disclosure, the processor 214 may generate a snapshot namespace of the file system 210 corresponding to each snapshot of the plurality of snapshots 216. The snapshot namespace may correspond to a logical hierarchical structure of the at least one respective snapshot object that store the point-in-time state of the at least one object associated with the file system 210.

At 306, a file operation command is received to perform at least one of the read file operation and the lookup file operation, corresponding to the at least one object, for example, the object 212D associated with a file system namespace of the file system 210. In an embodiment of the present disclosure, the file operation command to perform at least one of the read file operation and the lookup file operation is received after the namespace correlation between the file system namespace of the file system 210 and the snapshot namespace of the snapshot of the file system 210.

In an embodiment of the present disclosure, the file operation command is received from the user 208 via the user interface. In an embodiment of the present disclosure, the file operation command is received from applications, for example, the web applications, the cloud applications, and the like. In an embodiment of the present disclosure, the file operation command is received from system calls associated with the system 202. In an embodiment of the present disclosure, the file operation command is received via the API provided by the API service provider. In an embodiment of the present disclosure, the system 202 may initiate the file operation command based on the predetermined events, for example, based on the determination of the malware attack, the data corruption, the missing object associated with the file system 210.

At 308, a redirection operation is executed for at least one of the read file operation and the lookup file operation. In an embodiment of the present disclosure, the redirection operation is executed based on restoration data associated with the at least one object, for example, the object 212D. The restoration data indicates a current restoration state associated with the at least one object. The restoration data is explained in detail with reference to FIG. 6A. Further, the redirection operation routes the file operation command to the at least one respective snapshot object, for example, the snapshot object 220D corresponding to the at least one object, for example, the object 212D.

Referring back to FIG. 3, the execution of the redirection operation for the at least one of the read file operation and the lookup file operation based on the restoration data associated with the at least one object may allow the processor 214 to perform at least one of the read file operation and the lookup file operation corresponding to the snapshot, for example, the snapshot 218A of the file system 210 before the first write file operation on the at least one object by redirecting at least one of the read file operation and the lookup file operation for the at least object, for example, the object 212D associated with the file system namespace of the file system 210 to the at least one respective snapshot object, for example, the snapshot object 220D associated with the snapshot namespace of the file system 210. Accordingly, a block diagram is provided for the snapshot restoration in detail with reference to FIG. 4.

Figure 4:
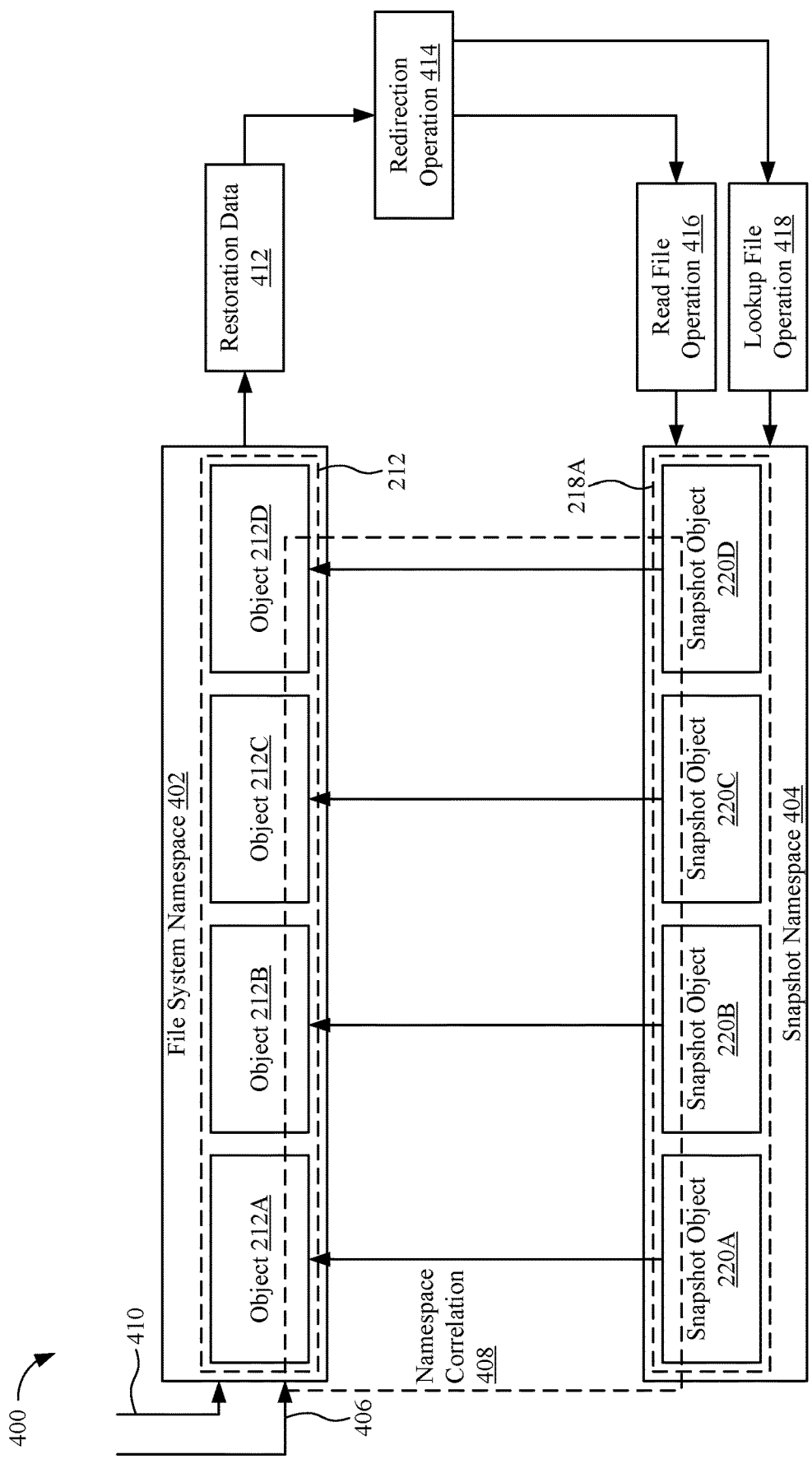
FIG. 4 is a block diagram illustrating an exemplary embodiment for the snapshot restoration, in accordance with an embodiment of the present disclosure.

FIG. 4 is a block diagram 400 illustrating an exemplary embodiment for the snapshot restoration operation, in accordance with an embodiment of the present disclosure. The block diagram 400 includes a file system namespace 402 associated with the file system 210, and a snapshot namespace 404 associated with the snapshot 218A of the file system 210. Further, the plurality of objects 212, for example, the object 210A, the object 210B, the object 210C, and the object 210D of the file system 210 are associated with the file system namespace 402.

Further, the snapshot object 220A, the snapshot object 220B, the snapshot object 220C, and the snapshot object 220D of the snapshot 218A are associated with the snapshot namespace 404.

In an embodiment of the present disclosure, the object 212D associated with the file system namespace 402 corresponds to the file. Accordingly, the snapshot object 220D associated with the snapshot namespace 404 corresponds to a respective snapshot file. The respective snapshot file may store the point-in-time state corresponding to the file. In another embodiment of the present disclosure, the object 212C associated with the file system namespace 402 corresponds to the directory. Accordingly, the snapshot object 220C associated with the snapshot namespace 404 corresponds to a respective snapshot directory.

The processor 214 may receive a restore command 406. In an embodiment of the present disclosure, the processor 214 may receive the restore command 406 corresponding to the snapshot 218A of the file system 210. Additionally, or alternatively, the processor 214 may receive the restore command 406 corresponding to each snapshot object associated with the snapshot namespace 404 of the snapshot 218A of the file system 210. In an embodiment of the present disclosure, the processor 214 may receive the restore command 406 corresponding to a selected snapshot object associated with the snapshot namespace 404. In an embodiment of the present disclosure, the processor 214 may receive the user input to select the at least one snapshot object, for example, the snapshot object 220D.

In an embodiment of the present disclosure, the processor 214 may freeze the file system 210 to enable an online restoration of the snapshot 218A of the file system 210 based on the reception of the restore command 406. The processor 214 may freeze the file system 210 based on at least one of the file system quiesce operation, the flush cached data operation, the invalidate cached data operation, the invalidate metadata operation.

The processor 214 may correlate, based on the reception of the restore command 406, the file system namespace 402 of the file system 210 with the snapshot namespace 404 of the snapshot 218A. In an embodiment of the present disclosure, the correlated file system namespace 402 may indicate, based on a snapshot namespace identifier associated with the snapshot 218A of the file system 210, the snapshot namespace 404 of the snapshot 218A. The namespace correlation 408 between the file system namespace 402 of the file system 210 and the snapshot namespace 404 of the snapshot 218A of the file system 210 may enable the processor 214 to receive the operation commands to perform the plurality of operations corresponding to at least one object associated with the file system namespace 402. The snapshot namespace identifier may correspond to one or a combination of numbers, letters, special characters, data bits, and the like.

The processor 214 may receive a file operation command 410 to perform at least one of a read file operation 416 and a lookup file operation 418, corresponding to the file associated with the file system namespace 402 of the file system 210. The read file operation 416 corresponds to the operation for retrieving the various types of data from the file. The lookup file operation 418 corresponds to the operation for searching for the specific portion of various types of data within the file. In an embodiment of the present disclosure, the processor 214 may perform the lookup file operation 418 based on the at least one key or the at least one identifier.

In an embodiment of the present disclosure, the file operation command 410 is a directory operation command. The processor 214 may receive the directory operation command to perform at least one of a read directory operation and a lookup directory operation, corresponding to the directory associated with the file system namespace 402 of the file system 210. In an embodiment of the present disclosure, the read directory operation corresponds to the operation for retrieving the various types of data from the directory. The lookup directory operation corresponds to the operation for searching for the specific portion of various types of data within the directory.

The processor 214 may execute a redirection operation 414 for at least one of the read file operation 416 and the lookup file operation 418. In an embodiment of the present disclosure, the processor 214 may execute the redirection operation 414 based on restoration data 412 associated with the at least one object. The redirection operation 414 routes the file operation 314030;
command 410 to the respective snapshot file corresponding to the file. In an embodiment of the present disclosure, the processor 214 may execute the redirection operation 414 for at least one of the read directory operation and the lookup directory operation. Further, the redirection operation 414 routes the directory operation command to the respective snapshot directory corresponding to the directory.

In an embodiment of the present disclosure, the restoration data 412 may indicate a partial restoration state associated with the at least one object. Additionally, or alternatively, the restoration data 412 may indicate a partial restoration of the at least one respective one snapshot object corresponding to the at least one object associated with the file system namespace 402. Further, the processor 214 may determine, based on a determination that the restoration data 412 indicates the partial restoration state of the at least one respective snapshot object corresponding to the at least one object associated with the file system namespace 402, a current block restoration state of each data block associated with the file system namespace 402. In an embodiment of the present disclosure, the block restoration data may indicate the current block restoration state of each data block associated with the at least one object. Further, the processor 214 may perform, based on the block restoration data associated with the file system namespace 402, at least one of the read file operation 416 and the lookup file operation 418 during the partial restoration state associated with the at least one object. Accordingly, a block diagram is provided below with reference to FIG. 5.

Figure 5:
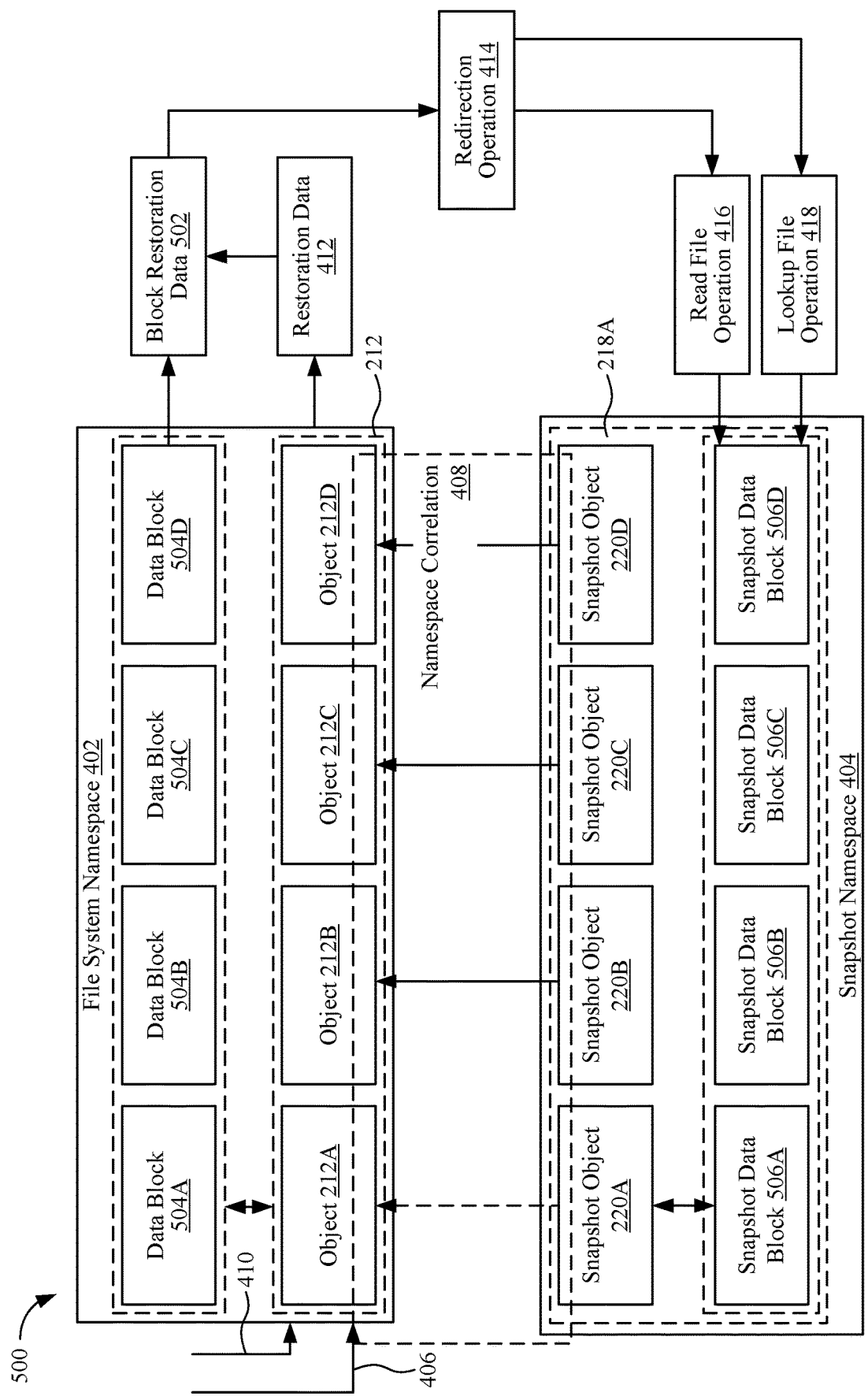
FIG. 5 is a block diagram illustrating an exemplary embodiment for the snapshot restoration, in accordance with an embodiment of the present disclosure.

FIG. 5 is a block diagram 500 illustrating an exemplary embodiment for the snapshot restoration, in accordance with an embodiment of the present disclosure. As shown in FIG. 5, the processor 214 may receive the file operation command 410 to perform the at least one of the read file operation 416 and the lookup file operation 418 corresponding to the object 212A associated with the file system namespace 402 of the file system 210.

The processor 214 may obtain, based on the restoration data 412 indicative of the partial restoration state associated with the file system namespace 402, block restoration data 502 corresponding to each data block, for example, a data block 504A, a data block 504B, a data block 504C, and a data block 504D associated with the file system namespace 402. Additionally, or alternatively, the data block 504A, the data block 504B, the data block 504C, and the data block 504D may be associated with the at least one object, for example, the object 212A. In an example embodiment of the present disclosure, each data block, for example, the data block 504A, the data block 504B, the data block 504C, and the data block 504D associated with the object 212A may store a respective portion of the various types of data stored in the object 212A. For the purpose of explanation, the file system namespace 402 comprising four data blocks is considered. However, the file system namespace 402 may comprise at least one data block.

Further, the snapshot namespace 404 associated with the snapshot 218A may include a snapshot data block 506A, a snapshot data block 506B, a snapshot data block 506C, and a snapshot data block 506D corresponding to the data block 504A, the data block 504B, the data block 504C and the data block 504D, respectively. In an embodiment of the present disclosure, the snapshot 218A stores a first point in-time state of the data block 504A, the data block 504B, the data block 504C, and a data block 504D corresponding to the snapshot data block 506A, the snapshot data block 506B, the snapshot data block 506C, and the snapshot data block 506D, respectively. For the purpose of explanation, the file system namespace 402 comprising four snapshot data block is considered. However, the snapshot namespace 404 may comprise at least one respective snapshot data block corresponding to the at least one data block. In an embodiment of the present disclosure, the processor 214 may generate the at least one respective snapshot data block corresponding to the at least one data block associated with file system namespace 402.

The block restoration data 502 may indicate the current block restoration state corresponding to each data block associated with the object 212A. The processor 214 may execute, based on the block restoration data 502 indicating at least one unrestored data block, for example, the data block 504A associated with the file system namespace 402, the redirection operation 414, Further, the redirection operation 414 routes the file operation command 410 to the at least one respective snapshot data block, for example, the snapshot data block 506A associated with the snapshot namespace 404. In an embodiment of the present disclosure, based on the block restoration data indicating at least one restored data block, for example, the data block 504B associated with the file system namespace 402, the processor 214 may perform the at least one of the read file operation 416 and the lookup file operation 418 corresponding to the at least one restored data block, for example, the data block 504B. In an embodiment of the present disclosure, the restoration data 412 associated with the file system namespace 402 may correspond to at least one flag based on the current restoration state associated with the file system namespace 402. Accordingly, the restoration data 412 is explained in detail with reference to FIG. 6A.

Figure 6A:
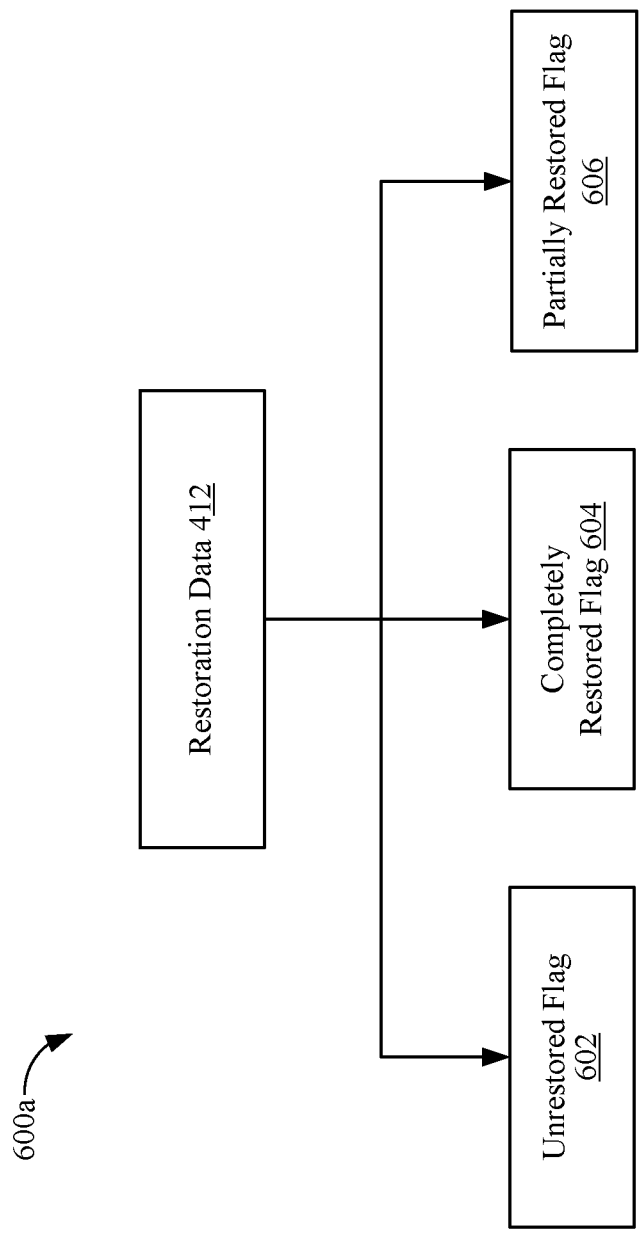
FIG. 6A is a block diagram illustrating restoration data, in accordance with an embodiment of the present disclosure.

FIG. 6A is a block diagram 600a illustrating the restoration data 412, in accordance with an embodiment of the present disclosure. As shown in FIG. 6A, the restoration data 412 associated with the at least one object may corresponds to at least one of an unrestored flag 602, a completely restored flag 604, and a partially restored flag 606, based on the current restoration state associated with the at least one object. Additionally, or alternatively, the restoration data 412 may indicate at least one of a timestamp of a last restoration operation, a frequency of the snapshot generation operation, a location of the plurality of snapshots 216, retention policies for the plurality of snapshots 216, and a restoration priority associated with the plurality of objects 212.

In an embodiment of the present disclosure, the restoration data 412 may correspond to the completely restored flag 604 to indicate a complete restoration state associated with the at least one object. Additionally, or alternatively, the restoration data 412 may correspond to the completely restored flag 604 to indicate a complete snapshot restoration of the at least one respective snapshot object associated the snapshot namespace 404 corresponding to the at least one object associated with the file system namespace 402.

In an embodiment of the present disclosure, the processor 214 may update the restoration data 412 to indicate the completely restored flag 604 based on completion of the snapshot restoration of each respective snapshot data block associated with the at least one snapshot object, for example, the snapshot object 220A corresponding to each data block associated with the at least one object, for example, the object 212A.

In an embodiment of the present disclosure, the restoration data 412 may correspond to the unrestored flag 602 to indicate an unrestored restoration state associated with the at least one object. Additionally, or alternatively, the restoration data 412 may correspond to the unrestored flag 602 to indicate a pending restoration of the at least one respective snapshot object associated the snapshot namespace 404 corresponding to the at least one object associated with the file system namespace 402.

In an embodiment of the present disclosure, the restoration data 412 may correspond to the partially restored flag 606 to indicate the partial restoration state associated with the at least one object. Additionally, or alternatively, the restoration data 412 may correspond to the partially restored flag 606 to indicate the partial restoration of the at least one respective snapshot object associated with the snapshot namespace 404 corresponding to the at least one object associated with the file system namespace 402.

Figure 6B:
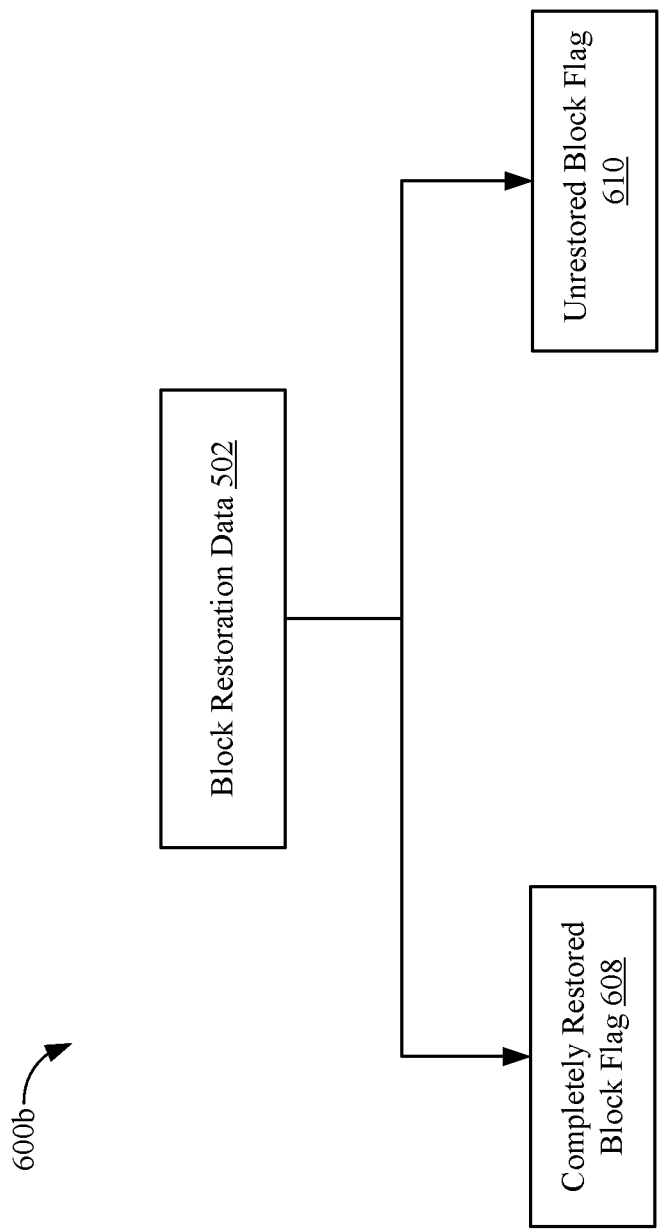
FIG. 6B is a block diagram illustrating block restoration data, in accordance with an embodiment of the present disclosure.

FIG. 6B is a block diagram 600b illustrating the block restoration data 502, in accordance with an embodiment of the present disclosure. As shown in FIG. 6B, the block restoration data 502 corresponds to at least one of a completely restored block flag 608, or an unrestored block flag 610 based on a current block restoration state of at least one data block associated with the at least one object.

In an embodiment of the present disclosure, the block restoration data 502 may correspond to the completely restored block flag 608 to indicate a complete restoration state associated with the at least one respective snapshot data block. Additionally or alternatively, the block restoration data 502 may correspond to the completely restored block flag 608 to indicate a snapshot restoration of the at least one respective snapshot data block associated with the at least one respective snapshot object corresponding to the at least one object data block associated with the at least one object.

In an embodiment of the present disclosure, the block restoration data 502 may correspond to the unrestored block flag 610 to indicate an unrestored restoration state associated with the at least one respective snapshot data block. Additionally or alternatively, the block restoration data 502 may correspond to the unrestored block flag 610 to indicate a pending snapshot restoration of the at least one respective snapshot data block associated with the at least one respective snapshot object corresponding to the at least one object data block associated with the at least one object.

In an embodiment of the present disclosure, the processor 214 may perform, based on write block data associated with the write file operation, the write file operation corresponding to the at least one data block associated with the at least one object. Accordingly, the write block data is explained in detail with reference to FIG. 6C.

Figure 6C:
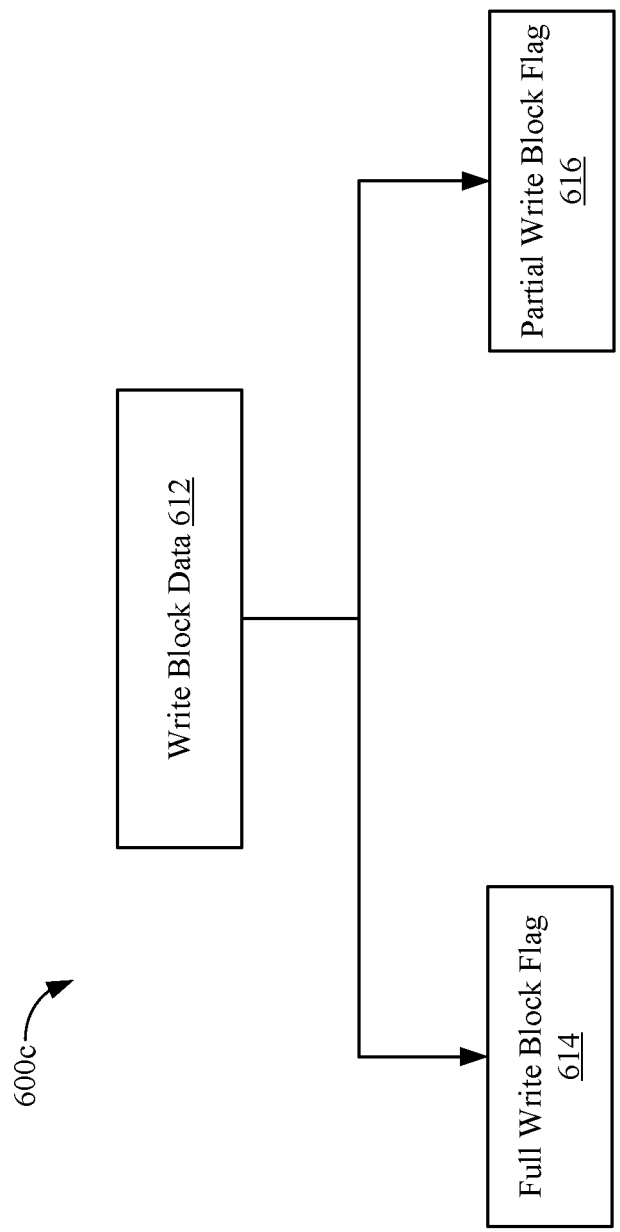
FIG. 6C is a block diagram illustrating write block data, in accordance with an embodiment of the present disclosure.

FIG. 6C is a block diagram 600c illustrating a write block data 612, in accordance with an embodiment of the present disclosure. As shown in FIG. 6C, the write block data 612 associated with a write file operation may correspond to at least one of a full write block flag 614 and a partial write block flag 616 based on an application of the write file operation corresponding to the at least one data block associated with the at least one object.

In an embodiment of the present disclosure, the write block data 612 may correspond to the full write block flag 614 based on a determination that the at least one block is completely updated based on the application of the write file operation.

In an embodiment of the present disclosure, the write block data 612 may correspond to the partial write block flag 616 based on a determination that the at least one block is partially updated based on the application of the write file operation.

In an embodiment of the present disclosure, the processor 214 may update the restoration data 412 to indicate a change in the current restoration state associated with the file system namespace 402. In an embodiment of the present disclosure, the processor 214 may update the restoration data 412 to indicate the completely restored flag 604 based on a completion of the restoration operation corresponding to the at least one object, for example, the object 212C associated with the file system namespace 402. In an embodiment of the present disclosure, the processor 214 may delete the snapshot, for example, the snapshot 218A after the completion of the restoration operation. Additionally, or alternatively, the processor 214 may delete the snapshot 218A based on a determination that the snapshot namespace 404 corresponds to the file system namespace 402.

In an embodiment of the present disclosure, the processor 214 may receive another file operation command to perform another file operation corresponding to the at least one object, for example, the object 212D associated with the file system namespace 402 of the file system 210, after the completion of the restoration operation. The processor 214 may execute, based on the updated restoration data 412 indicative of the completely restored flag 604, another file operation based on the at least one object, for example, the object 212D associate with the file system namespace 402.

Figure 7A:
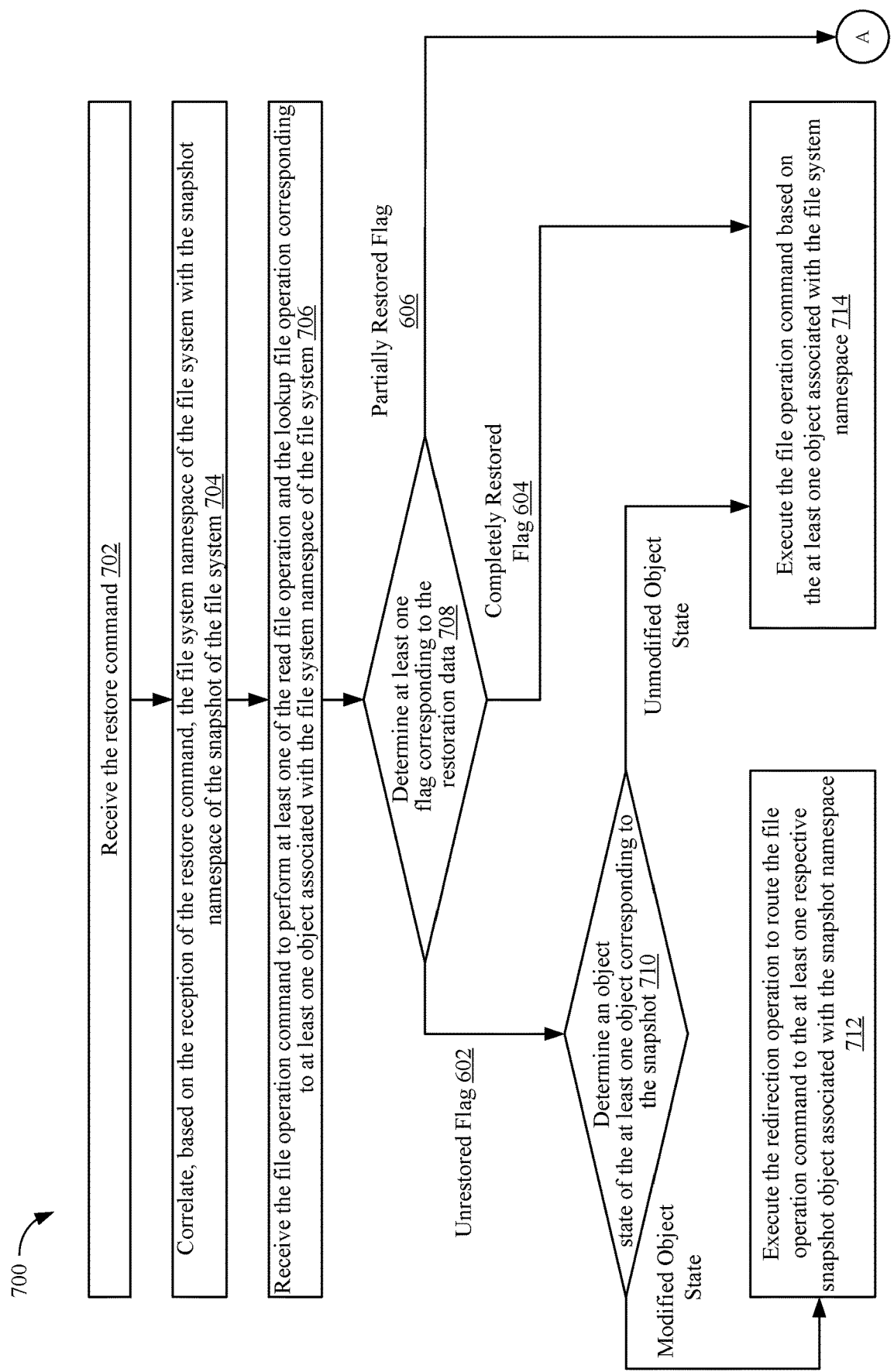
FIG. 7A and FIG. 7B, collectively, is a flowchart of an exemplary method for the snapshot restoration, in accordance with an embodiment of the present disclosure.
Figure 7B:
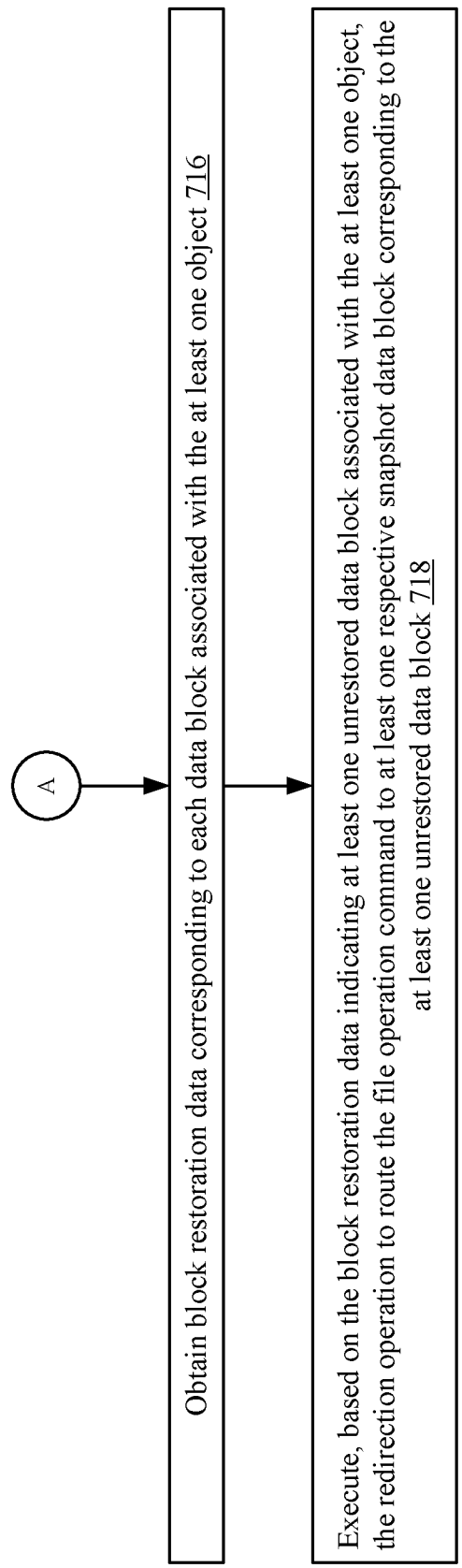

FIG. 7A and FIG. 7B, collectively, is a flowchart 700 of an exemplary method for the snapshot restoration, in accordance with an embodiment of the present disclosure. In one or more embodiments of the present disclosure, the system 202 may perform one or more operations of the flowchart 700 and may be implemented by, for instance, the processor set 114. As such, the system 202 may provide means for accomplishing embodiments of other processes described herein in conjunction with other components of the system 202. Although the flowchart 700 is illustrated as a sequence of operations, it is contemplated that various embodiments of the flowchart 700 may be performed in any order or combination and need not include all of the illustrated operations.

At 702, the restore command 406 is received. In an embodiment of the present disclosure, the restore command 406 is received to corresponding to the snapshot, for example, the snapshot 218A of the file system 210.

At 704, the file system namespace 402 of the file system 210 is correlated, based on the reception of the restore command 406, the snapshot namespace 404 of the snapshot 218A of the file system 210.

At 706, the file operation command 410 is received to perform at least one of the read file operation 416 and the lookup file operation 418, corresponding to the at least one object, for example, the object 212D associated with the file system namespace 402 of the file system 210.

At 708, at least one flag corresponding to the restoration data 412 is determined. In an embodiment of the present disclosure, the restoration data 412 may correspond to the at least one flag based on the current restoration state of the at least one object.

At 710, an object state of the at least one object, for example, the object 212D corresponding to the snapshot 218A of the file system 210 is determined based on a determination that the restoration data 412 corresponds to the unrestored flag 602.

At 712, the redirection operation 414 is executed based on a determination that object state of the at least one object, for example, the object 212D indicates a modified object state corresponding to the snapshot 218A of the file system 210. The modified object state may indicate that the at least one object is updated after the generation of the snapshot 218A. The redirection operation 414 routes the file operation command 410 to the at least one respective snapshot object associated with the snapshot namespace 404, for example, the snapshot object 220D.

At 714, the file operation command 410 is executed based on a determination that the object state of the at least one object, for example, the object 212D indicates an unmodified object state corresponding to the snapshot 218A of the file system 210. The unmodified object state may indicates that the at least one object is unmodified after the generation of the snapshot, for example, the snapshot 218A of the file system 210. Further, the file operation command 410 is executed based on the at least one object, for example, the object 212D associated with the file system namespace 402. Additionally or alternatively, at 714, the file operation command 410 is executed based on a determination that the restoration data 412 corresponds to the unrestored flag 602. In an embodiment of the present disclosure, the restoration data 412 is updated to indicate the completely restored flag 604 based on a determination that the object state of the at least one object, for example, the object 212D indicates the unmodified object state corresponding to the snapshot 218A of the file system 210, Referring to FIG. 7B, at 716, the block restoration data 502 corresponding to each data block associated with the file system namespace 402 is obtained based on a determination that the restoration data 412 corresponds to the partially restored flag 606.

At 718, the redirection operation 414 is executed based on the block restoration data 502 indicating at least one unrestored data block associated with the file system namespace 402 the. The redirection operation 414 routes the file operation command 410 to at least one respective snapshot data block associated with the snapshot namespace 404.

Referring back to FIG. 7A and FIG. 7B, the processor 214 may decouple the restoration of the file system and the individual objects, for example, the object 212A, the object 212B, the object 212C, and the object 212D based on the namespace correlation 408. In an embodiment of the present disclosure, the processor 214 may store the restoration data 412 that may indicate the current restoration state corresponding to the snapshot restoration.

Figure 8:
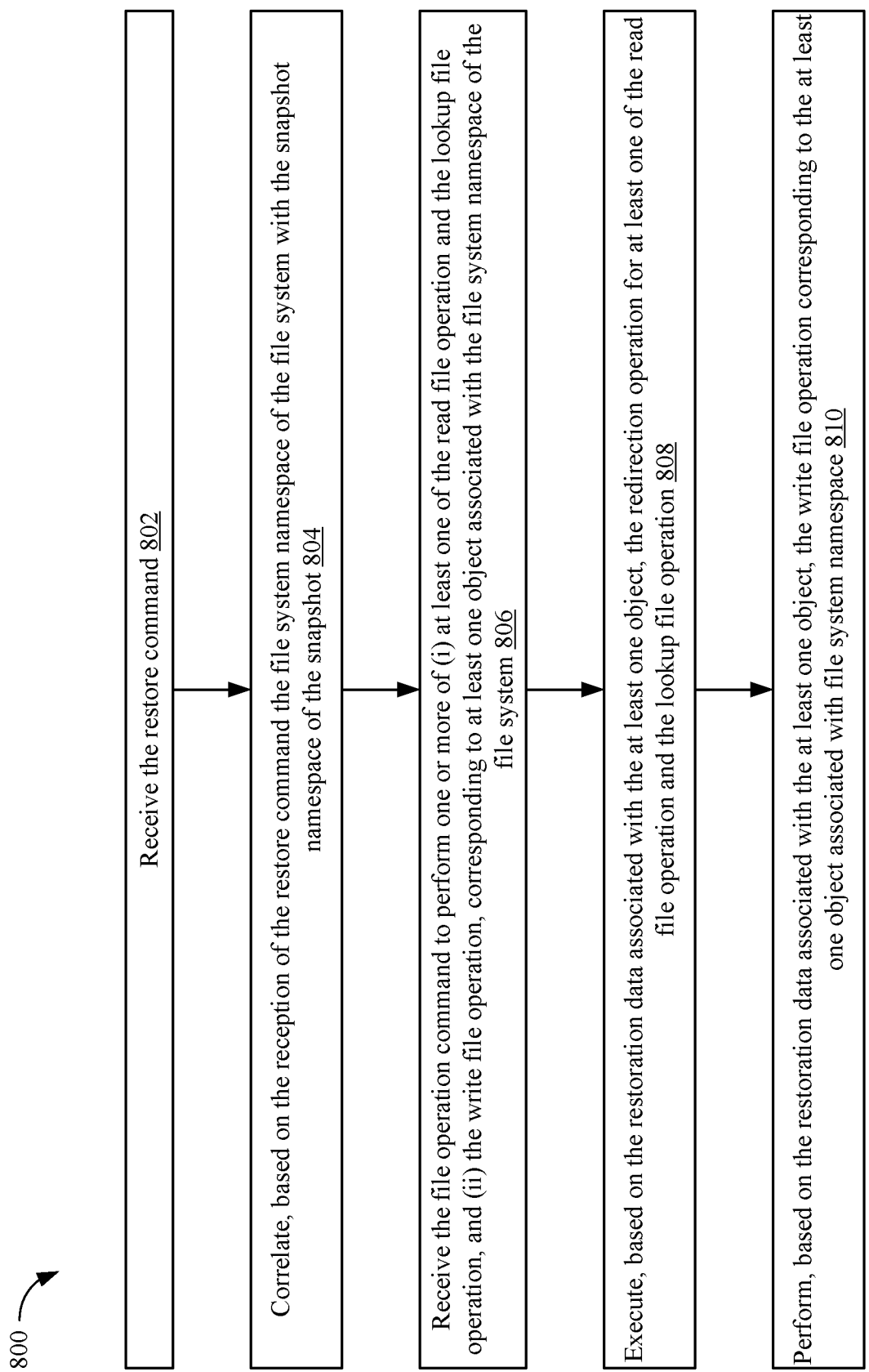
FIG. 8 is a flowchart of an exemplary method for the snapshot restoration, in accordance with an embodiment of the present disclosure.

FIG. 8 is a flowchart of an exemplary method 800 for the snapshot restoration, in accordance with an embodiment of the present disclosure. In one or more embodiments of the present disclosure, the system 202 may perform one or more operations of the method 800 and may be implemented by, for instance, the processor 214. As such, the system 202 may provide means for accomplishing embodiments of other processes described herein in conjunction with other components of the system 202. Although the method 800 is illustrated as a sequence of operations, it is contemplated that various embodiments of the method 800 may be performed in any order or combination and need not include all of the illustrated operations.

At 802, the restore command 406 is received. In an embodiment of the present disclosure, the restore command 406 is received to corresponding to the snapshot, for example, the snapshot 218A of the file system 210.

At 804, the file system namespace 402 of the file system 210 is correlated with the snapshot namespace 404 of the snapshot 218A of the file system 210, based on the reception of the restore command 406.

At 806, the file operation command 410 is received to perform one or more of (i) the read file operation 416 and the lookup file operation 418, and (ii) the write file operation corresponding to the at least one object, for example, the object 212D associated with the at least one object. In an embodiment of the present disclosure, the file operation command 410 is a directory operation command. The processor 214 may receive the directory operation command to perform the write directory operation, corresponding to the directory associated with the file system namespace 402 of the file system 210.

At 808, the redirection operation 414 is executed for at least one of the read file operation 416 and the lookup file operation 418. In an embodiment of the present disclosure, the redirection operation 414 is executed based on the restoration data 412 associated with the at least one object. The redirection operation 414 routes the file operation command 410 to at least one respective snapshot object, for example, the snapshot object 220D corresponding to the at least one object, for example, the object 212D. At 810, the write file operation is performed corresponding to the at least one object associated with the file system namespace 402 based on the restoration data 412 associated with the at least one object. In an embodiment of the present disclosure, the write file operation may update the various types of data stored in the plurality of objects, for example, the file, the directory and the sub-directory.

Referring back to FIG. 8, the execution of the redirection operation 414 for the at least one of the read file operation 416 and the lookup file operation 418 operation based on the restoration data associated with the at least one object may allow the processor 214 to perform at least one of the read file operation and the lookup file operation corresponding to the snapshot, for example, the snapshot 218A of the file system 210 before the first write file operation on the at least one object by redirecting at least one of the read file operation 416 and the lookup file operation 418 for the at least object, for example, the object 212D associated with the file system namespace 402 of the file system 210 to the at least one respective snapshot object, for example, the snapshot object 220D associated with the snapshot namespace 404 of the file system 210. Accordingly, a block diagram is provided for the snapshot restoration in detail with reference to FIG. 9

Figure 9:
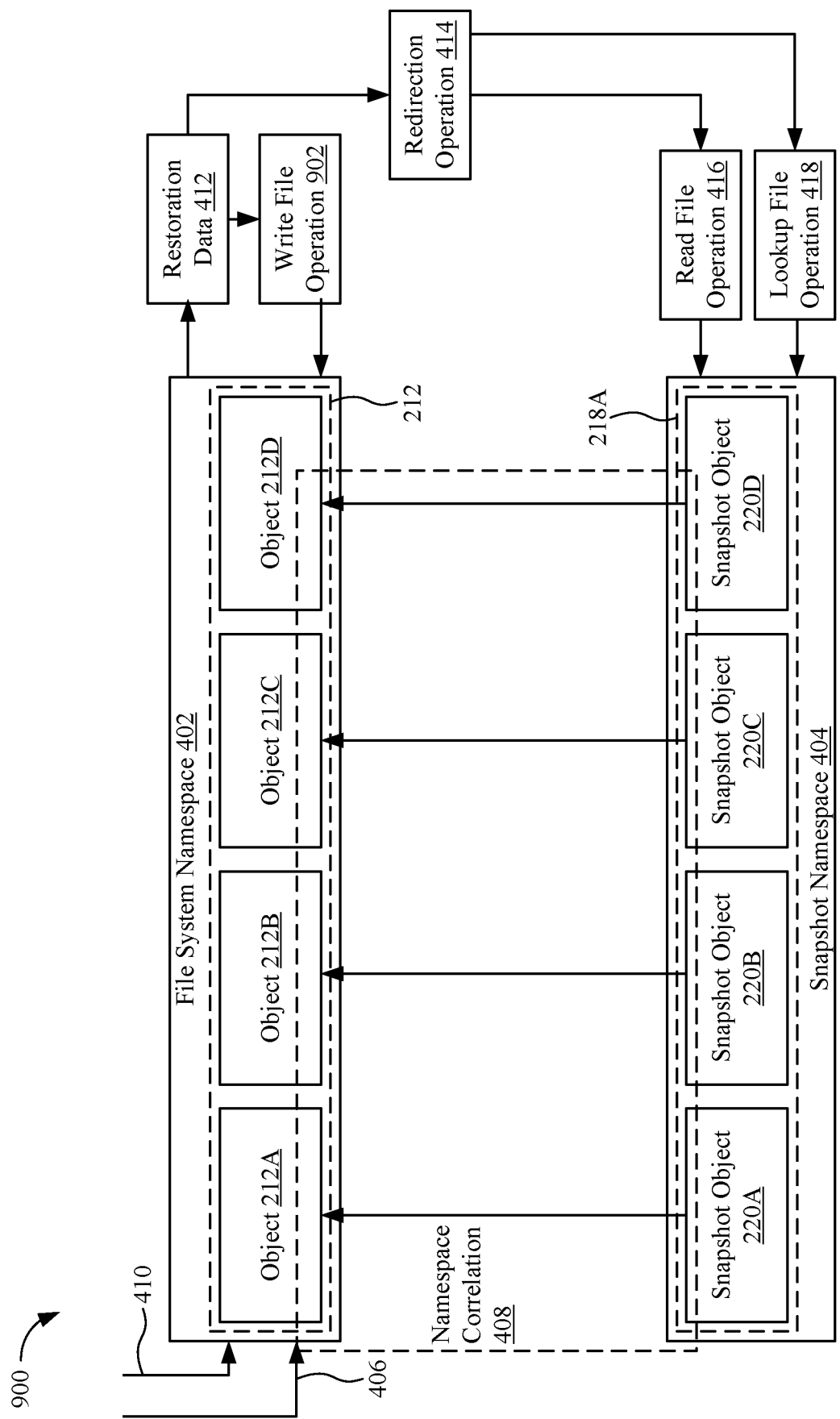
FIG. 9 is a block diagram illustrating an exemplary embodiment for the snapshot restoration, in accordance with an embodiment of the present disclosure.

FIG. 9 is a block diagram 900 illustrating an exemplary embodiment for the snapshot restoration, in accordance with an embodiment of the present disclosure. As shown in FIG. 9, the processor 214 may receive the file operation command 410 to perform one or more of (i) at least one of the read file operation 416 and the lookup file operation 418, and (ii) a write file operation 902, corresponding to the at least one object, for example, the object 212D associated with the file system namespace 402 of the file system 210.

The processor 214 may execute, based on the restoration data 412 associated with the at least one object, the redirection operation 414 for at least one of the read file operation 416 and the lookup file operation 418. The redirection operation 414 routes the file operation command 410 to the at least one respective snapshot object, for example, the snapshot object 220D corresponding to the at least one object, for example, the object 212D.

The processor 214 may perform the write file operation 902 corresponding to the file system namespace 402. Additionally, or alternatively, the processor 214 may perform the write file operation 902 corresponding to the at least one object, for example, the object 212D associated with the file system namespace 402. The write file operation 902 is the operation for updating the various types of data stored within the file.

Figure 10:
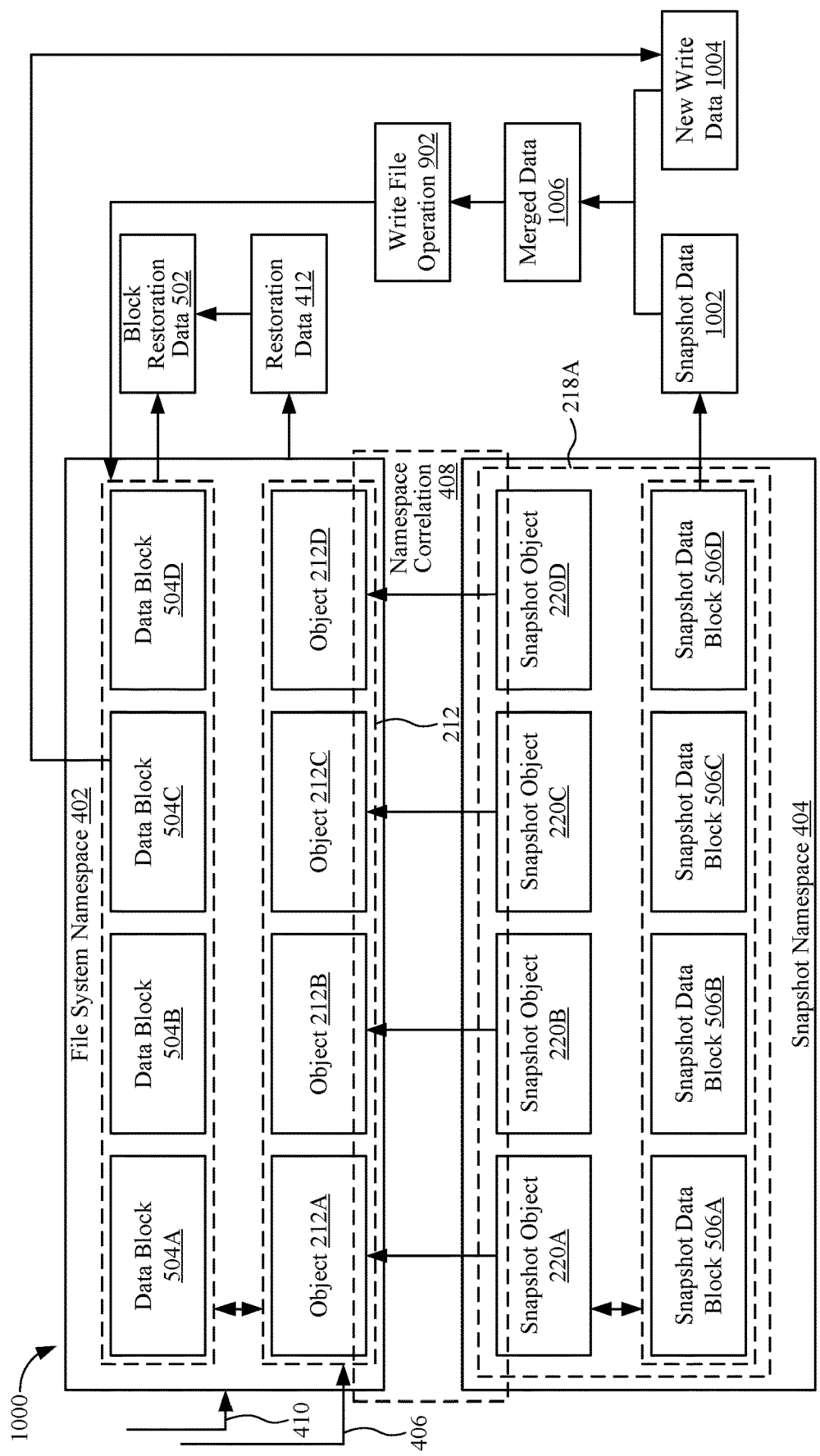
FIG. 10 is a block diagram illustrating an exemplary embodiment for the snapshot restoration, in accordance with an embodiment of the present disclosure.

FIG. 10 is a block diagram 1000 illustrating an exemplary embodiment for the snapshot restoration, in accordance with an embodiment of the present disclosure. As shown in FIG. 10, the processor 214 may receive the file operation command 410 to perform at least one of (i) at least one of the read file operation 416 and the lookup file operation 418, and (ii) the write file operation 902, corresponding to the at least one object, for example, the object 212D associated with the file system namespace 402 of the file system 210.

The processor 214 may obtain, based on a determination that the restoration data 412 indicate the partial restoration state associated with the file system namespace 402, snapshot data 1002 of the at least one respective snapshot object, for example, the snapshot object 220C associated with the snapshot namespace 404. The snapshot data 1002 include, but are not limited to, suffix data, and prefix data associated with the file system namespace 402. The prefix data may correspond to the various types of data stored at the beginning corresponding to the snapshot object 220C. The prefix data may include, but are not limited to, file headers, and format data. The suffix data may correspond to the various types of data stored at the end corresponding to the snapshot object 220C. The suffix data may include, but are not limited to, metadata, timestamps, permissions, and file attributes associated with the snapshot object 220C.

The processor 214 may obtain the new write data 1004 associated with the write file operation 902 corresponding to the at least one data block associated with the at least one object.

The processor 214 may merge the snapshot data 1002 and the new write data 1004 to generate merged data 1006 corresponding to the snapshot namespace 404.

The processor 214 may perform the write file operation 902, based on the generated merged data 1006, corresponding to the at least one data block associated with the at least one object. In an embodiment of the present disclosure, the processor 214 may initiate background threads to traverse the plurality of objects 212 associated with the file system namespace 402 and restore object inode content associated with the at least one object from snapshot inodes associated with the at least one respective snapshot object.

Figure 11A:
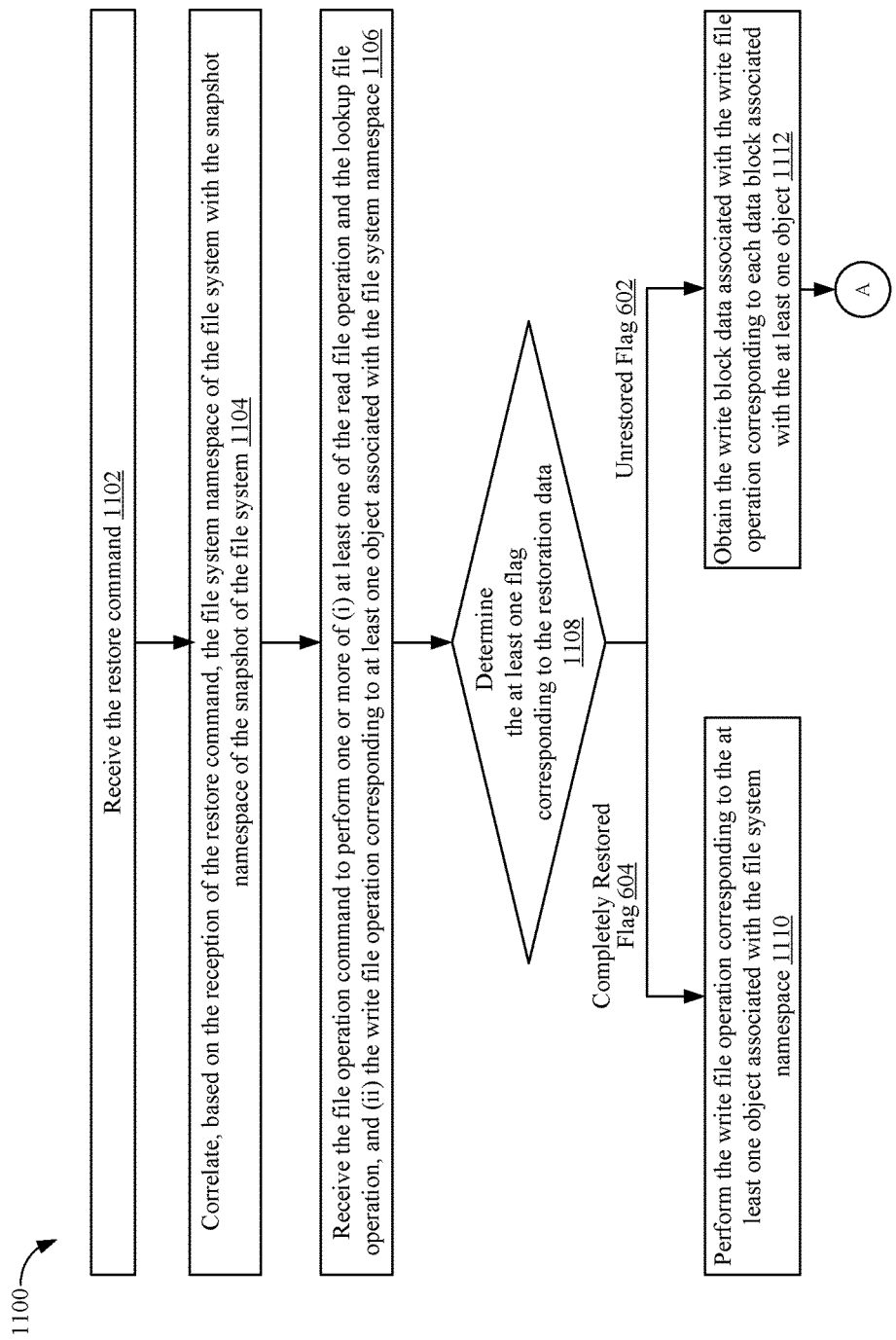
FIG. 11A, FIG. 11B, and FIG. 11C, collectively, is a flowchart of an exemplary method for the snapshot restoration, in accordance with an embodiment of the present disclosure.
Figure 11B:
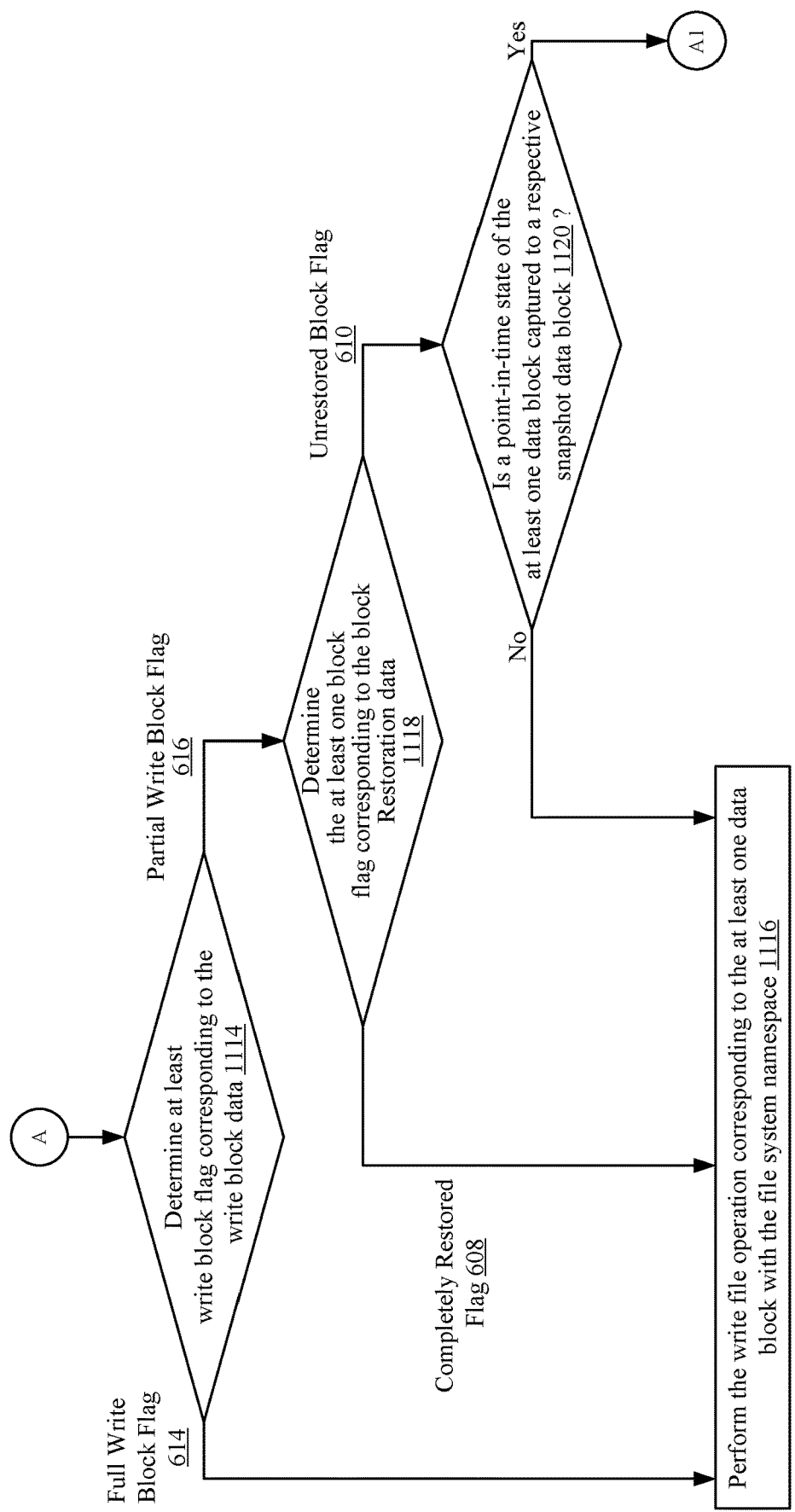
Figure 11C:
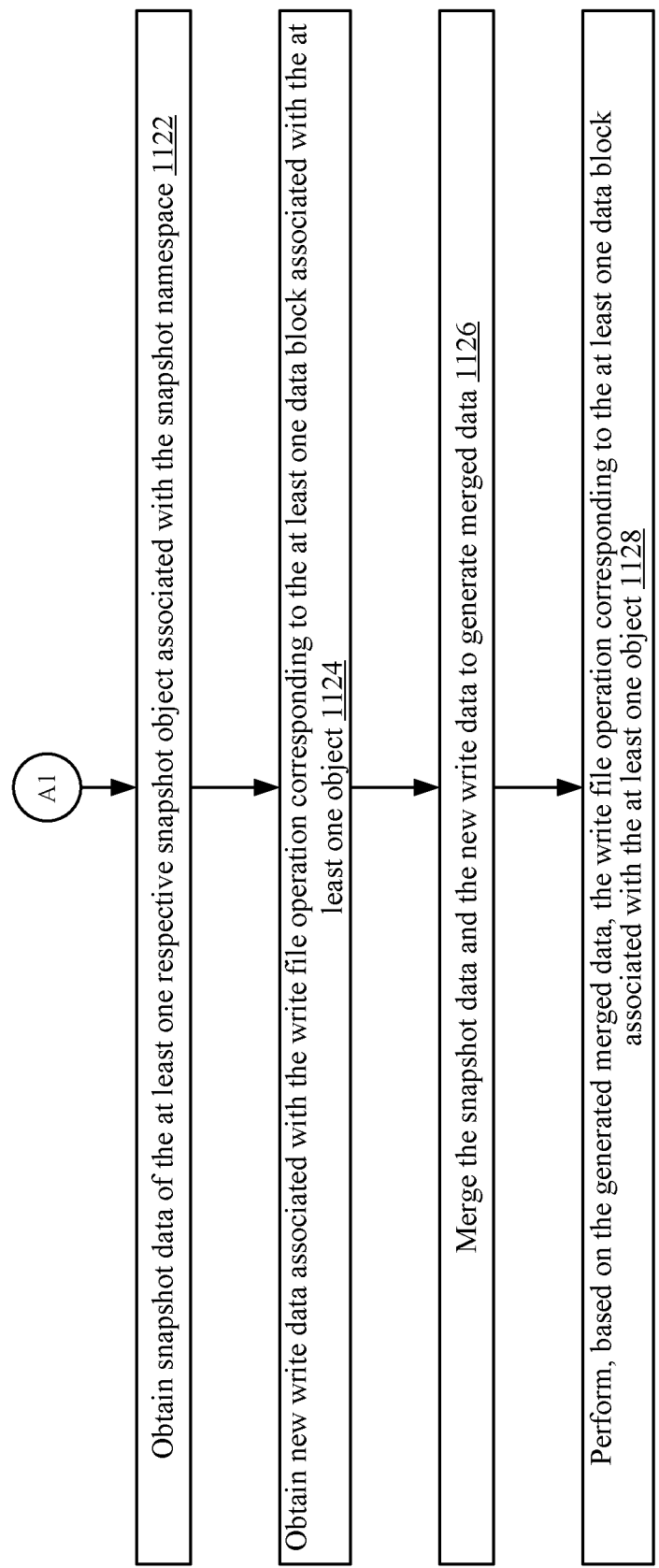

FIG. 11A, FIG. 11B, and FIG. 11C, collectively, is a flowchart 1100 of an exemplary method for the snapshot restoration, in accordance with an embodiment of the present disclosure. In one or more embodiments of the present disclosure, the system 202 may perform one or more operations of the flowchart 1100 and may be implemented by, for instance, the processor 214. As such, the system 202 may provide means for accomplishing embodiments of other processes described herein in conjunction with other components of the system 202. Although the flowchart 1100 is illustrated as a sequence of operations, it is contemplated that various embodiments of the flowchart 1100 may be performed in any order or combination and need not include all of the illustrated operations.

At 1102, the restore command 406 is received. In an embodiment of the present disclosure, the restore command 406 is received to corresponding to the snapshot, for example, the snapshot 218A of the file system 210.

At 1104, the file system namespace 402 of the file system 210 is correlated with the snapshot namespace 404 of the snapshot 218A of the file system 210, based on the reception of the restore command 406.

At 1106, the file operation command 410 to perform (i) at least one of the read file operation 416 and the lookup file operation 418, and (ii) the write file operation 902 corresponding to the at least one object associated with the file system namespace 402.

At 1108, the at least one flag corresponding to the restoration data 412 is determined.

At 1110, perform, based on a determination that the restoration data 412 associated with the at least one object corresponds to the completely restored flag 604, the write file operation 902 corresponding to the at least one object associated with the file system namespace 402 is performed.

At 1112, based on a determination that the restoration data 412 associated with the at least one object corresponds to the unrestored flag 602, the write block data 612 associated with the write file operation 902 corresponding to each data block associated with the at least one object is obtained.

Referring to FIG. 11B, at 1114, at least one write block flag corresponding to the write block data 612 is determined.

At 1116, the write file operation 902 corresponding to the at least one object associated with the file system namespace 402 is performed based on a determination that write block data 612 associated with the write file operation 902 corresponds to the full write block flag 614. Additionally or alternatively, the block restoration data 502 is updated to indicate the completely restored block flag 608 corresponding to the at least one data block associated with the at least one object.

At 1118, the at least one block flag corresponding to the block restoration data 502 is determined based on a determination that the write block data 612 corresponds to the partial write block flag 616. Additionally or alternatively, at 1116, the write file operation 902 corresponding to the at least one data block with the file system namespace 402 is performed based on a determination that the block restoration data 502 corresponds to the completely restored block flag 608.

At 1120, based on a determination that the block restoration data 502 corresponds to the unrestored block flag 610, a determination is made whether a point-in-time state of the at least one data block is captured to a respective snapshot data block or not. If the point-in-time state of the at least one data block is not captured to the respective snapshot data block, then, at 1116, the write file operation 902 is performed corresponding to the at least one data block associated with the at least one object.

However, if the point-in-time state of the at least one object is captured to the respective snapshot data block, then, referring to FIG. 11C, at 1122, the snapshot data 1002 of the at least one respective snapshot data block associated with the snapshot namespace 404 is obtained.

At 1124, the new write data 1004 associated with the write file operation 902 corresponding to the at least one data block associated with the at least one object is obtained.

At 1126 the snapshot data 1002 and the new write data 1004 is merged to generate the merged data 1006.

At 1128, the write file operation 902 corresponding to the at least one data block associated with the at least one object is performed based on the generated merged data 1006.

In an embodiment of the present disclosure, the processor 214 may perform the restoration operation corresponding to orphan entries associated with at least one of the file system namespace 402, and the snapshot namespace 404. The orphan entries may correspond to objects that are created and/or deleted before the reception of the restore command 406.

Figure 12A:
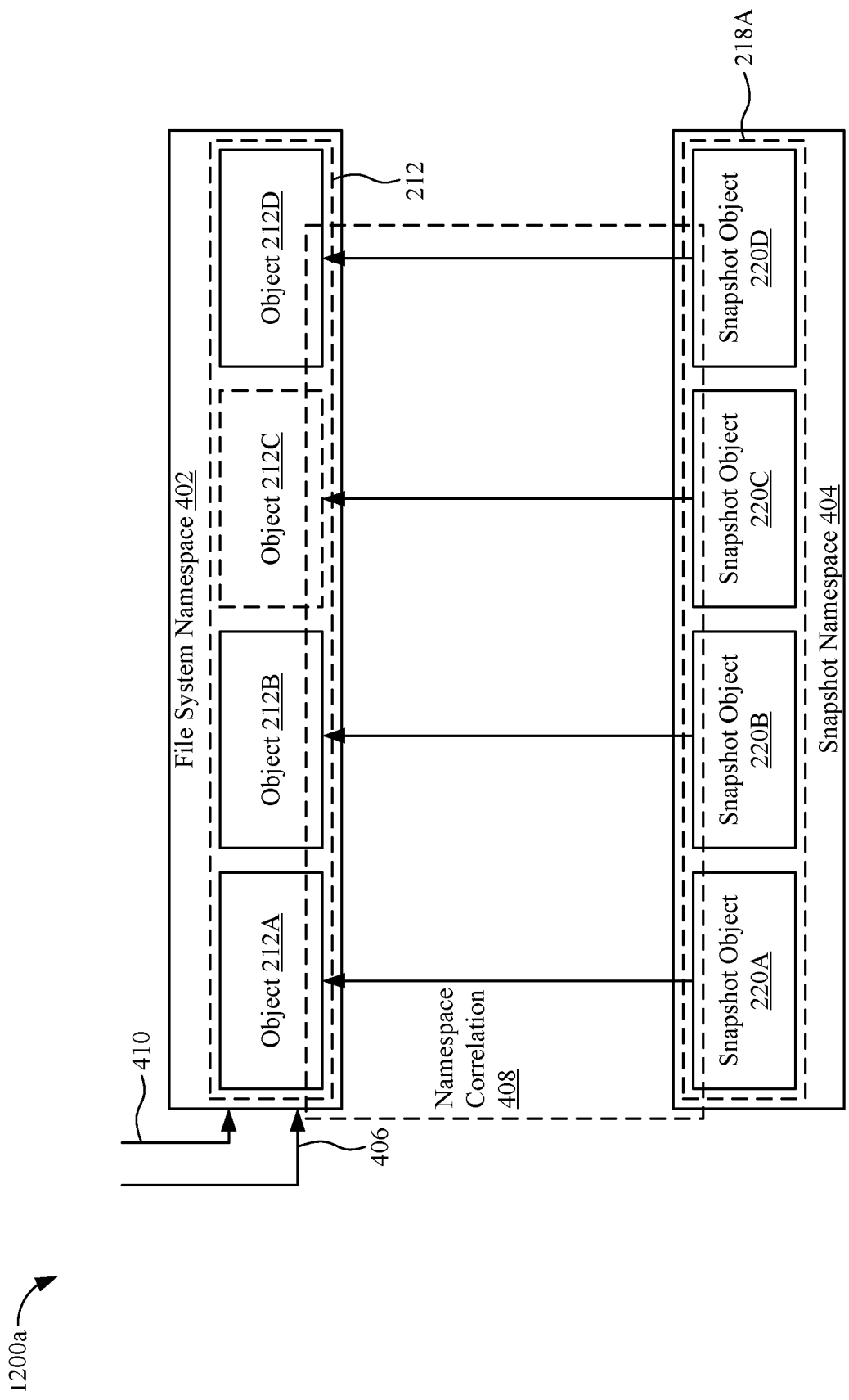
FIG. 12A is a block diagram illustrating an exemplary embodiment for the snapshot restoration, in accordance with an embodiment of the present disclosure.

FIG. 12A is a block diagram 1200a illustrating an exemplary embodiment for the snapshot restoration, in accordance with an embodiment of the present disclosure. As shown in FIG. 12A, the object 212C corresponds to a deleted object. In an example embodiment, the restoration data 412 may indicate the deletion of the object 212C before the reception of the restore command 406. The processor 214 may restore, based on the restoration data 412 indicative of the deletion of the object 212C is deleted before the reception of the restore command 406, the at least one respective snapshot object, for example, the snapshot object 220C. In an embodiment of the present disclosure, the processor 214 may obtain respective snapshot object attributes, for example, a snapshot inode number, a snapshot generation number and the like associated with the at least one snapshot object, for example, the snapshot object 220C corresponding to the at least one object, for example, the object 212C. Further, the processor 214 may restore, based on the respective snapshot object attributes associated with the snapshot object 220C, the snapshot object 220C corresponding to the object 212C.

Figure 12B:
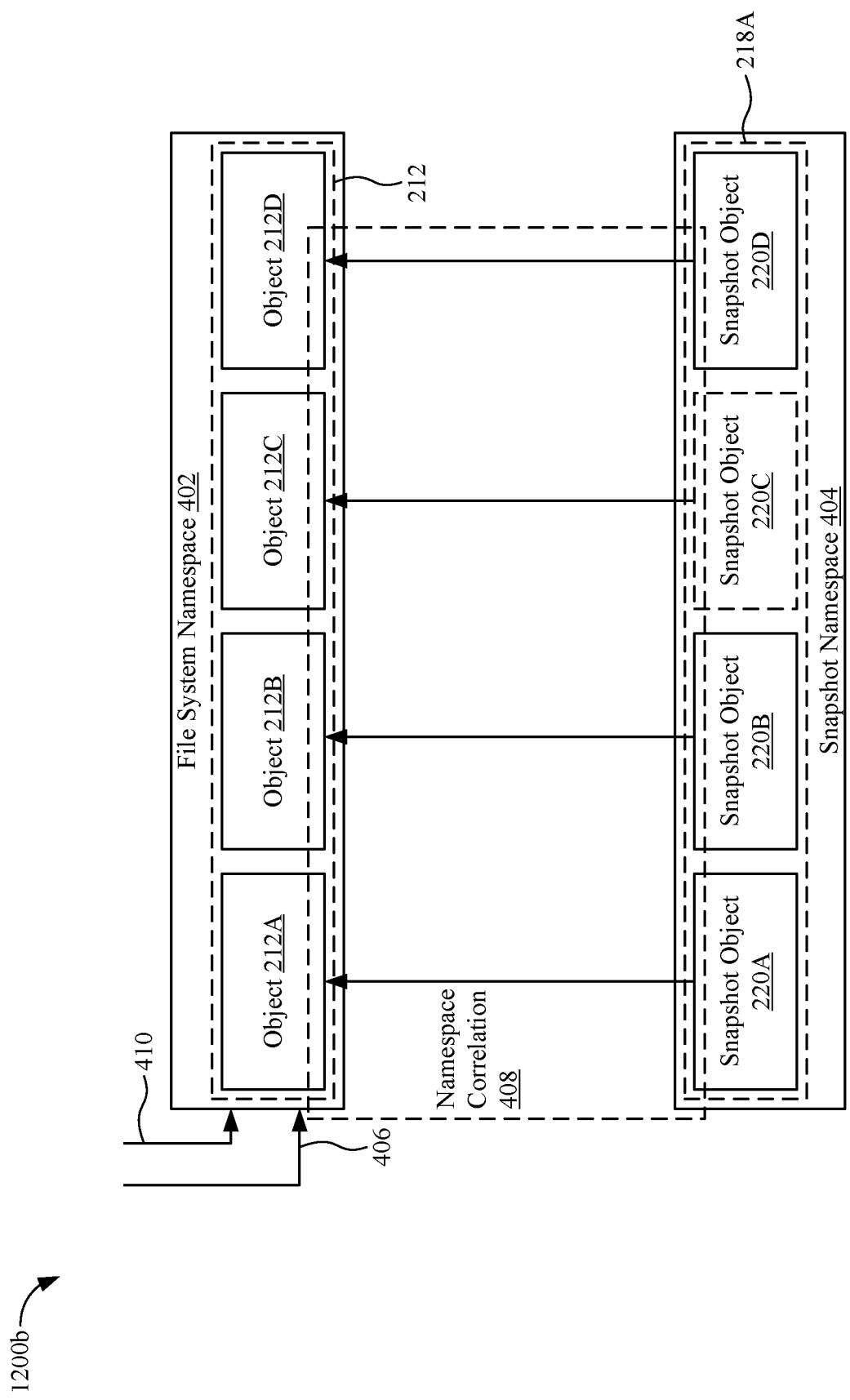
FIG. 12B is a block diagram illustrating an exemplary embodiment for the snapshot restoration, in accordance with an embodiment of the present disclosure.

FIG. 12B is a block diagram 1200b illustrating an exemplary embodiment for the snapshot restoration, in accordance with an embodiment of the present disclosure. As shown in FIG. 12B, the snapshot object 220C corresponds to a deleted snapshot object. In an example embodiment, the restoration data 412 may indicate an absence of the snapshot object 220C corresponding to the object 212C before the reception of the restore command 406. In an embodiment of the present disclosure, the processor 214 may perform a deletion operation, based on the restoration data 412 indicative of the absence of the snapshot object 220C before the reception of the restore command 406.

Various embodiments of the present disclosure may utilize the plurality of read-only snapshots to perform the plurality of operations, for example, the read file operation 416, the lookup file operation 418, and the write file operation 902 based on the namespace correlation of the file system namespace of the file system with the snapshot namespace of the snapshot of the file system. Various embodiments may overcome the problems associated with comparison operation between the file system 210 and the snapshot data 1002 of the snapshot 218A by decoupling the restoration operation and restoration of the individual object, for example, the object 212A, the object 212B, the object 212C, and the object 212D corresponding to the restoration operation based on the restoration data 412. The restoration data 412 may correspond to the at least one flag based on the current restoration state of the at least one object associated with the file system namespace 402. In an embodiment of the present disclosure, the redirection operation 414 is executed, based on the restoration data 412 corresponds to the unrestored flag 602, for the at least one of the read file operation 416 and the lookup file operation 418. The redirection operation 414 routes the file operation command 410 to the at least one respective snapshot object, for example, the snapshot object 220D corresponding to the at least one object, for example, the object 212D. Further, in an embodiment of the present disclosure, the restoration data 412 may be updated to indicate the completely restored flag 604. In an embodiment of the present disclosure, another file operation command received after the restore command 406 is executed corresponding to the file system namespace 402 based on a determination that the restoration data 412 corresponds to the completely restored flag 604.

Various embodiments of the disclosure may provide a non-transitory computer readable medium and/or storage medium having stored thereon, instructions executable by a machine and/or a computer to operate a system (e.g., the system 202) for snapshot restoration. The instructions may cause the machine and/or computer to perform operations that include, receiving a restore command. The operations further include correlating, based on the reception of the restore command, a file system namespace of the file system with a snapshot namespace of snapshot of the file system. The operations further include receiving a file operation command to perform at least one of a read file operation and a lookup file operation, corresponding to at least one object associated with the file system namespace of the file system. The operations further include executing, based on restoration data associated with the at least one object, a redirection operation for at least one of the read file operation and the lookup file operation, wherein the redirection operation routes the file operation command to at least one respective snapshot object corresponding to the at least one object, and wherein the at least one respective snapshot object is associated with a snapshot namespace of the snapshot of the file system.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-implemented method, comprising:
receiving a restore command;
correlating, based on the reception of the restore command, a file system namespace of a file system with a snapshot namespace of a snapshot of the file system;
receiving a file operation command to perform at least one of a read file operation or a lookup file operation, corresponding to at least one object associated with the file system namespace of the file system, wherein
the at least one object is associated with restoration data that corresponds to at least one of a completely restored flag, an unrestored flag, or a partially restored flag, and
the restoration data indicates a current restoration state associated with the at least one object;
obtaining, based on a determination that the restoration data associated with the at least one object corresponds to the partially restored flag, block restoration data corresponding to each data block associated with the at least one object; and
executing, based on the block restoration data indicating at least one unrestored data block associated with the at least one object, a redirection operation for at least one of the read file operation or the lookup file operation, wherein
the redirection operation routes the file operation command to at least one respective snapshot data block corresponding to the at least one unrestored data block,
the at least one respective snapshot data block is associated with at least one respective snapshot object, and
the at least one respective snapshot object is associated with the snapshot namespace of the snapshot of the file system.

2. The computer-implemented method of claim 1, wherein the correlated file system namespace of the file system indicates, based on a snapshot namespace identifier associated with the snapshot of the file system, the snapshot namespace of the snapshot of the file system.

3. The computer-implemented method of claim 1, wherein
the block restoration data indictive of a current block restoration state of at least one data block associated with the at least one object.

4. A system, comprising:
a memory that stores instructions; and
a processor configured to execute the instructions to:
receive a restore command;
correlate, based on the reception of the restore command, a file system namespace of a file system with a snapshot namespace of a snapshot of the file system;
receive a file operation command to perform one or more of:
at least one of a read file operation or a lookup file operation corresponding to at least one object associated with the file system namespace of the file system, and
a write file operation corresponding to the at least one object, wherein
the at least one object is associated with restoration data that corresponds to at least one of a completely restored flag, an unrestored flag, or a partially restored flag, and
the restoration data indicates a current restoration state associated with the at least one object;
obtain, based on a determination that the restoration data associated with the at least one object corresponds to the partially restored flag, block restoration data corresponding to each data block associated with the at least one object; and
execute, based on the block restoration data indicating at least one unrestored data block associated with the at least one object, a redirection operation for at least one of the read file operation or the lookup file operation, wherein
the redirection operation routes the file operation command to at least one respective snapshot data block corresponding to the at least one unrestored data block, the at least one respective snapshot data block is associated with at least one respective snapshot object, and the at least one respective snapshot object is associated with the snapshot namespace of the snapshot of the file system; and perform, based on the restoration data associated with the at least one object, the write file operation corresponding to the at least one object associated with the file system namespace.

5. The system of claim 4, wherein the correlated file system namespace indicates, based on a snapshot namespace identifier associated with the snapshot of the file system, the snapshot namespace of the snapshot of the file system.

6. The system of claim 4, wherein the block restoration data corresponds to at least one of a completely restored block flag, or an unrestored block flag based on a current block restoration state of at least one data block associated with the at least one object.

7. The system of claim 6, wherein the processor is further configured to:

obtain, based on a determination that the restoration data associated with the at least one object corresponds to the unrestored flag, write block data associated with the write file operation corresponding to each data block associated with the at least one object; and perform, based on the write block data associated with the write file operation, the write file operation corresponding to the at least one data block associated with the at least one object, wherein the write block data corresponds to at least one of a full write block flag or a partial write block flag based on an application of the write file operation corresponding to the at least one data block associated with the at least one object.

8. The system of claim 7, wherein the processor is further configured to:

perform, based on a determination that the write block data corresponds to the full write block flag, the write file operation corresponding to the at least one data block associated with the at least one object.

9. The system of claim 7, wherein the processor is further configured to:

obtain, based on a determination that the write block data corresponds to the partial write block flag, the block restoration data corresponding to each data block associated with the at least one object;

obtain, based on a determination that the block restoration data corresponds to the unrestored block flag, and a point-in-time state of the at least one data block is captured to the at least one respective snapshot data block, snapshot data of the at least one respective snapshot data block associated with the snapshot namespace;

obtain new write data associated with the write file operation corresponding to the at least one data block associated with the at least one object;

merge the snapshot data and the new write data to generate merged data; and perform, based on the generated merged data, the write file operation corresponding to the at least one data block associated with the at least one object.

10. A computer program product for snapshot restoration, the computer program product comprising a computer readable storage medium having program instructions embodied therewith, the program instructions executed by a system to perform operations comprising:

receiving a restore command;

correlating, based on the reception of the restore command, a file system namespace of a file system with a snapshot namespace of a snapshot of the file system;

receiving a file operation command to perform at least one of a read file operation or a lookup file operation, corresponding to at least one object associated with the file system namespace of the file system, wherein the at least one object is associated with restoration data that corresponds to at least one of a completely restored flag, an unrestored flag, or a partially restored flag, and the restoration data indicates a current restoration state associated with the at least one object;

obtaining, based on a determination that the restoration data associated with the at least one object corresponds to the partially restored flag, block restoration data corresponding to each data block associated with the at least one object; and executing, based on the block restoration data indicating at least on unrestored data block associated with the at least one object, a redirection operation for at least one of the read file operation or the lookup file operation, wherein the redirection operation routes the file operation command to at least one respective snapshot data block corresponding to the at least one unrestored data block, the at least one respective snapshot data block is associated with at least one respective snapshot object, and the at least one respective snapshot object is associated with the snapshot namespace of the snapshot of the file system.

\* \* \* \* \*